(12) United States Patent
Roehrig

(10) Patent No.: US 11,020,656 B2
(45) Date of Patent: Jun. 1, 2021

(54) HANDHELD TACTILE SIMULATOR SYSTEM FOR ENHANCING THE MOTION PICTURE VIEWING EXPERIENCE

(71) Applicant: Joshua Roehrig, Greenock, PA (US)

(72) Inventor: Joshua Roehrig, Greenock, PA (US)

( * ) Notice: Subject to any disclaimer, the term of this patent is extended or adjusted under 35 U.S.C. 154(b) by 22 days.

(21) Appl. No.: 16/512,424

(22) Filed: Jul. 16, 2019

(65) Prior Publication Data

US 2021/0016165 A1    Jan. 21, 2021

(51) Int. Cl.
*A63F 13/20* (2014.01)
*A63F 13/285* (2014.01)
*G06F 3/01* (2006.01)

(52) U.S. Cl.
CPC ............ *A63F 13/285* (2014.09); *G06F 3/014* (2013.01); *G06F 3/016* (2013.01); *A63F 2250/025* (2013.01); *A63F 2300/1037* (2013.01); *A63F 2300/1043* (2013.01); *A63F 2300/302* (2013.01)

(58) Field of Classification Search
None
See application file for complete search history.

(56) References Cited

U.S. PATENT DOCUMENTS

| | | | |
|---|---|---|---|
| 6,686,901 B2* | 2/2004 | Rosenberg | A63F 13/06 345/156 |
| 8,644,967 B2 | 2/2014 | Seiler | |
| 8,939,838 B2* | 1/2015 | Alten | A63F 13/95 463/37 |
| 9,402,113 B1 | 4/2016 | Seiler | |
| 9,390,630 B2 | 7/2016 | Daniels | |
| 9,746,933 B2* | 8/2017 | Burba | A63F 13/20 |
| 10,198,074 B2* | 2/2019 | Grant | G05G 9/047 |
| 2010/0283731 A1* | 11/2010 | Grant | G06F 3/016 345/158 |
| 2013/0225288 A1* | 8/2013 | Levin | A63F 13/285 463/31 |
| 2016/0274662 A1 | 9/2016 | Rimon | |

* cited by examiner

*Primary Examiner* — Sunit Pandya

(57) ABSTRACT

A tactile simulation system according to the present invention configured to be used by a subject watching a motion picture. The tactile simulation system comprises a handgrip section, a recoil section, and a controller. The handgrip section configured to generate one or more vibration experienced by the subject holding the handgrip section. The recoil section generates one or more recoil simulation. The recoil section is removably attached to the handgrip section. Further, the controller is operably connected to the handgrip section and the recoil section. The controller is configured to operate the handgrip section and the recoil section based on the motion picture.

6 Claims, 24 Drawing Sheets

HANDHELD TACTILE SIMULATOR SYSTEM FOR ENHANCING THE MOTION PICTURE VIEWING EXPERIENCE

CROSS REFERENCE TO RELATED APPLICATIONS

This application claims priority to U.S. Provisional Application 62/698,283 filed on Jul. 16, 2018 entitled "SYSTEM, METHOD, AND FEEL DEVICE FOR SEMI-PRESENT EXPERIENCE THROUGH MOTION PICTURES".

BACKGROUND

Field

In general, the subject matter relates to techniques for enhancing the motion picture viewing experience, more particularly, but not exclusively to a tactile simulator for a viewer of a motion picture.

Discussion of Related Field

Incorporating additional senses to a motion picture, to enhance the user experience and compliment the conventional audio and visuals information has been under research and development for several years now.

Conventional research is focused more on inclusion of odor or scent to a motion picture to enhance viewer experience. With the advent of video games, highend gaming machines, and action movies there is an interest in simulating the sense of weapon firing, particularly at the hands of the user. Seiler in U.S. Pat. No. 8,644,967 discloses vibrating footwear receiving signals from an entertainment unit. In U.S. Pat. No. 9,402,113 Seiler also teaches multiple vibratory devices on a person's body activated by audio nearby. In US Published Application 2016/0274662, Rimon discloses gloves connected to a head-mounted display and haptic signals interacting with a video game. Daniels in U.S. Pat. No. 9,390,630 discloses tactile stimulators on the hand and active by a wireless receiver on the wrist.

SUMMARY

Accordingly, an improved technique for tactile simulation is proposed. In an embodiment, a tactile simulation system according to the present invention is configured to be used by a subject watching a motion picture. The tactile simulation system includes a handgrip section, a recoil section, and a controller. The handgrip section configured to generate one or more vibration experienced by the subject holding the handgrip section. The recoil section generates one or more recoil simulation. The recoil section is removably attached to the handgrip section. Further, the controller is operably connected to the handgrip section and the recoil section. The controller is configured to operate the handgrip section and the recoil section based on the motion picture.

In another embodiment, the recoil section comprises an actuator, a wheel, and a piston section. The wheel is operably connected to the actuator and the piston section operably connected to the wheel such that the rotation of the wheel sets the piston in a linear motion.

In another embodiment, the abrupt movement of the piston section within the recoil section generates the one or more recoil simulation to the subject holding the tactile simulation system.

In another embodiment, the recoil section comprises a shaft attached to a surface of the wheel facing the piston section. Further, the shaft is positioned away from the center of the wheel and perpendicular to the surface.

In another embodiment, the piston section and the wheel are connected through the slot rail, which receive the shaft on the surface of the wheel.

In another embodiment, the movement of the shaft along the slot rail sets the piston section in linear motion. Further, the direction of movement of the piston section is perpendicular to the height direction of the subject holding the tactile simulation system.

In another embodiment, the movement of the shaft along the slot rail sets the piston section in linear motion. Further, the direction of movement of the piston section is perpendicular to the height direction of the subject holding the tactile simulation system.

In another embodiment, the recoil section comprises a coupling section, which is configured to be detachably attached to the handgrip section.

In another embodiment, the tactile simulation system is secured to the hand of the subject through a strap such that one end of the strap connected to the hand grip section and the other end of the strap is connected to the recoil section.

In another embodiment, the recoil section further comprises a piston guide tunnel. The piston section comprises a piston head at each end of the piston section and a slot rail there between. Further, the movement of the piston heads is arrested in directions other than the direction of the internal wall within the piston guide tunnel.

In another embodiment, the strap is connected to the recoil section through a clip, which is securely held by the coupling section.

In another embodiment, the handgrip section comprises at least one vibration motor configured to generate one or more vibrations. Further, the tactile simulation system is portable and held in the palm of the subject.

In another embodiment, a tactile simulation system configured to be used by a subject watching a motion picture is provided. The tactile simulation system includes a recoil section and a controller. The recoil section is configured to generate one or more recoil simulation, and the controller is operably connected to the recoil section, and it is configured to operate the recoil section based on the motion picture. The recoil section includes an actuator, a wheel and a piston section. The wheel is operably connected to the actuator and the piston section is operably connected to the wheel such that the rotation of the wheel sets the piston in a linear motion. Further, the abrupt movement of the piston section within the recoil section generates the one or more recoil simulation to the subject holding the tactile simulation system.

Other objects, features, and advantages of the present invention may become apparent from the following detailed description. It shall be understood that, the detailed description and specific examples, while indicating preferred embodiments of the present invention, are given by way of illustration only and various modifications may naturally be performed without deviating from the scope of the present invention.

BRIEF DESCRIPTION OF THE DRAWINGS

Embodiments are illustrated by way of example and not limited by the Figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments are described in enough detail to enable those skilled in the art to practice the present subject matter. However, it will be apparent to one with ordinary skill in the art that the present invention may be practiced without these specific details. In other instances, well-known methods, procedures, components, wiring and circuits have not been described in detail so as not to unnecessarily obscure aspects of the embodiments. The embodiments can be combined, other embodiments can be utilized, or structural, logical modifications can be made without departing from the scope of what is claimed. The following detailed description describes the best mode of the invention and is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclose techniques to enhance the user experience of a viewer watching a motion picture. For example, the tactile simulation system includes a handgrip section, a recoil section, and a controller. The handgrip section configured to generate one or more vibration experienced by the subject holding the handgrip section. The recoil section generates one or more recoil simulation. The recoil section is removably attached to the handgrip section. Further, the controller is operably connected to the handgrip section and the recoil section. The controller is configured to operate the handgrip section and the recoil section based on the motion picture.

Figure 1A:
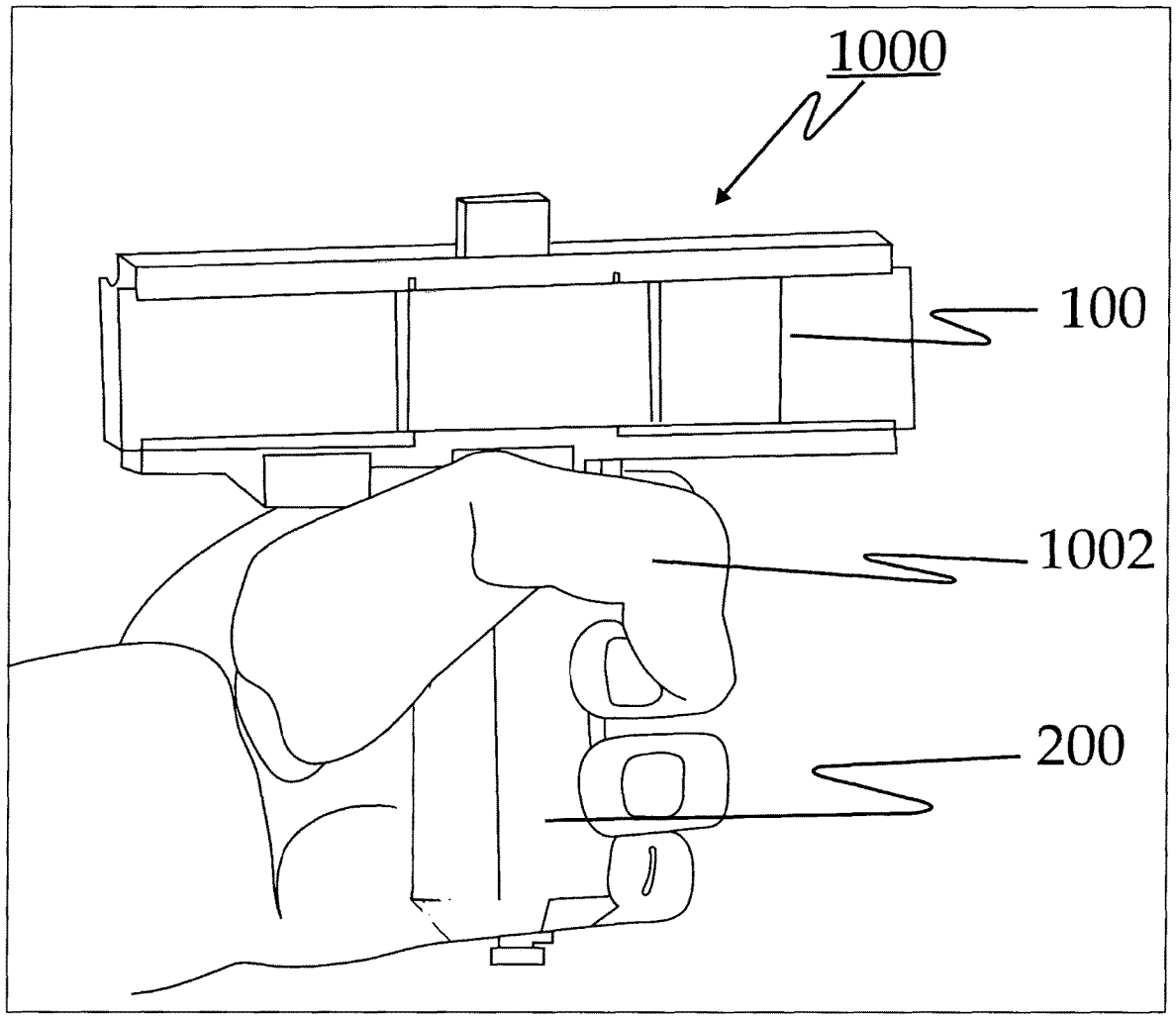
FIG. 1A depicts an exemplary view of a tactile simulation system 1000 held by a subject 1002, in accordance with an embodiment of the invention.
Figure 1B:
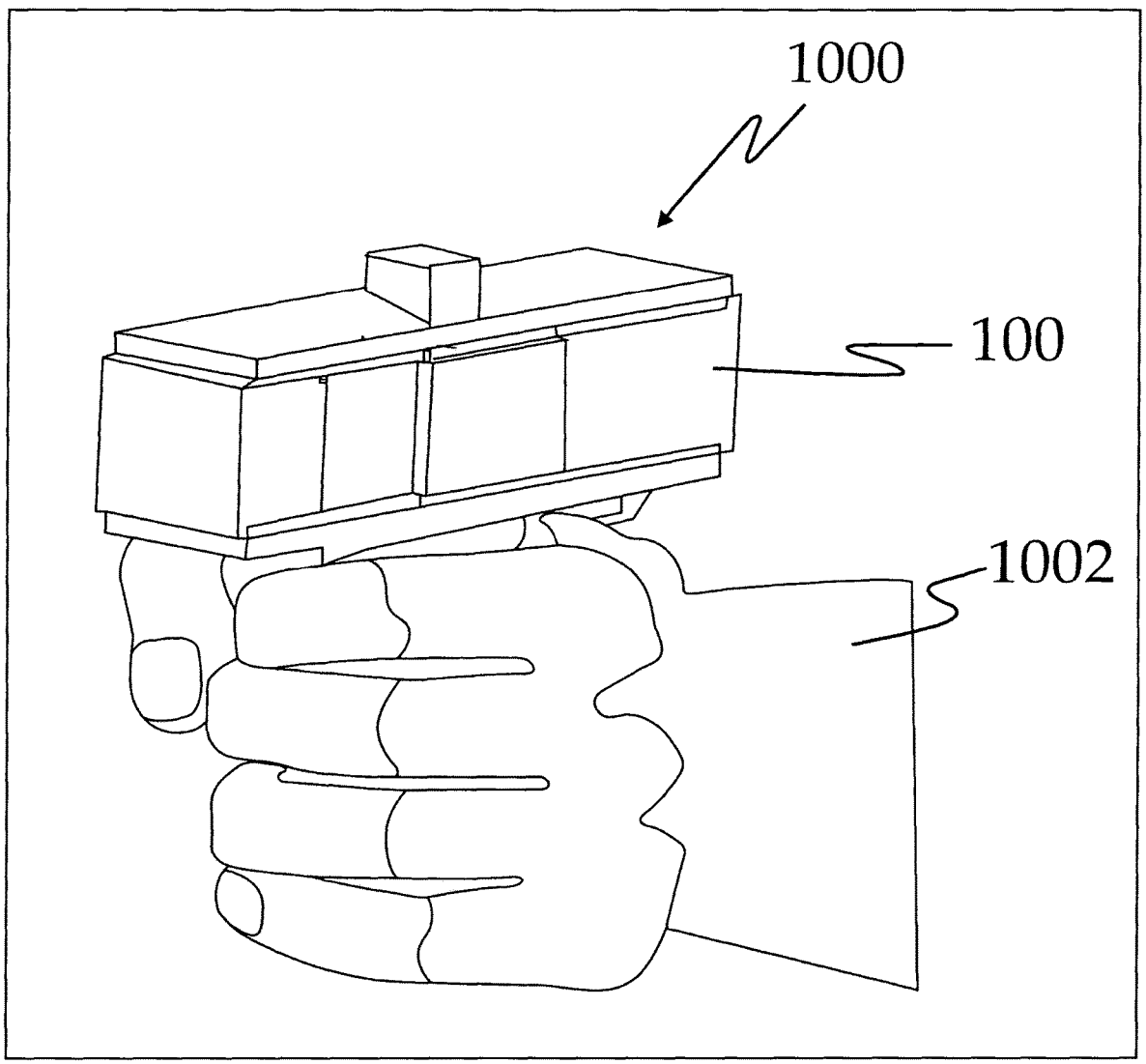
FIG. 1B depicts another exemplary view of a tactile simulation system 1000 held by a subject 1002, in accordance with an embodiment of the invention.

FIG. 1A depicts an exemplary view of a tactile simulation system 1000 held by a subject 1002, in accordance with an embodiment of the invention. As depicted the tactile simulation system 1000 includes a handgrip section 200 and a recoil section 100. The tactile simulation system 1000 when operated by a controller 1004 simulates a recoil effect and one or more vibrations to enhance the user experience of the subject 1000 watching a motion picture. FIG. 1B depicts another exemplary view of a tactile simulation system 1000 held by a subject 1002, in accordance with an embodiment of the invention. In the instant embodiment the handgrip section 200 is held in the first of the subject 1002.

Figure 2A:
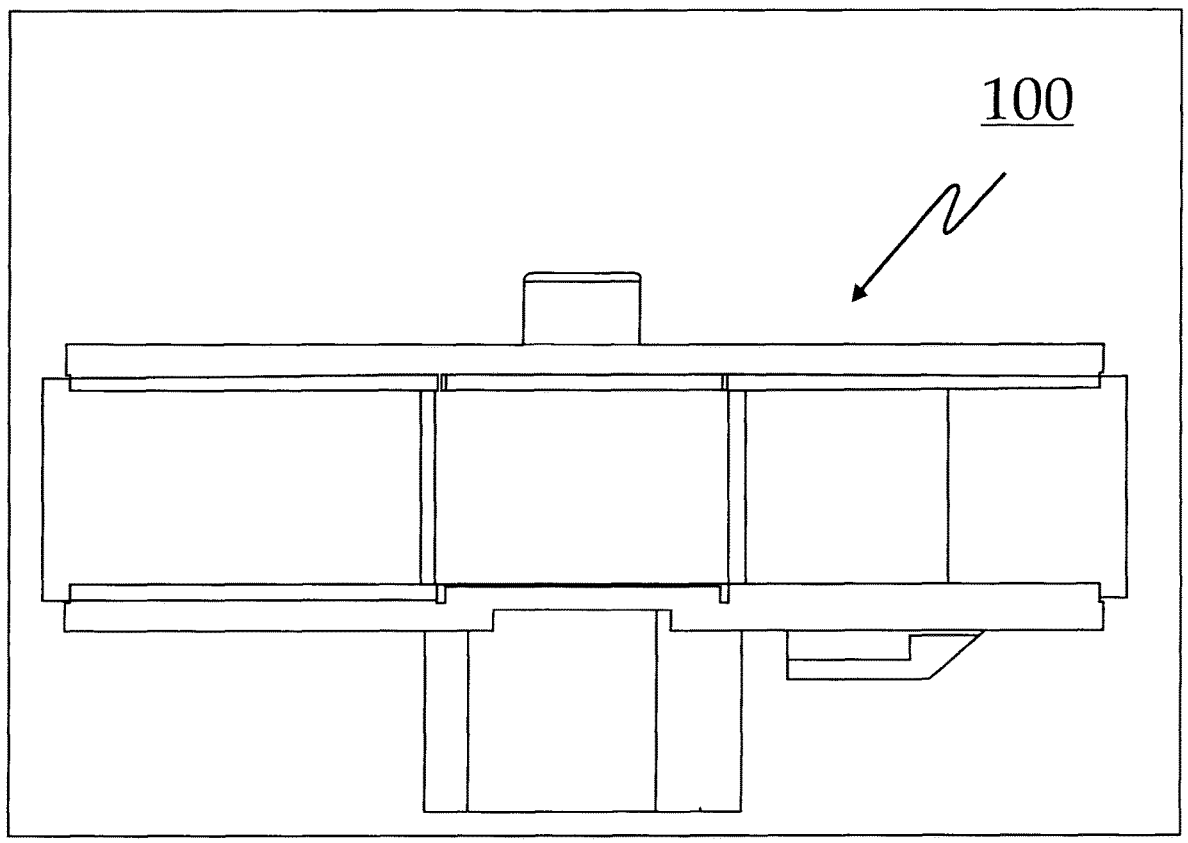
FIGS. 2A & 2B illustrate exemplary views of the recoil section 100 of the tactile simulation system 1000, in accordance with an embodiment of the invention.
Figure 2B:
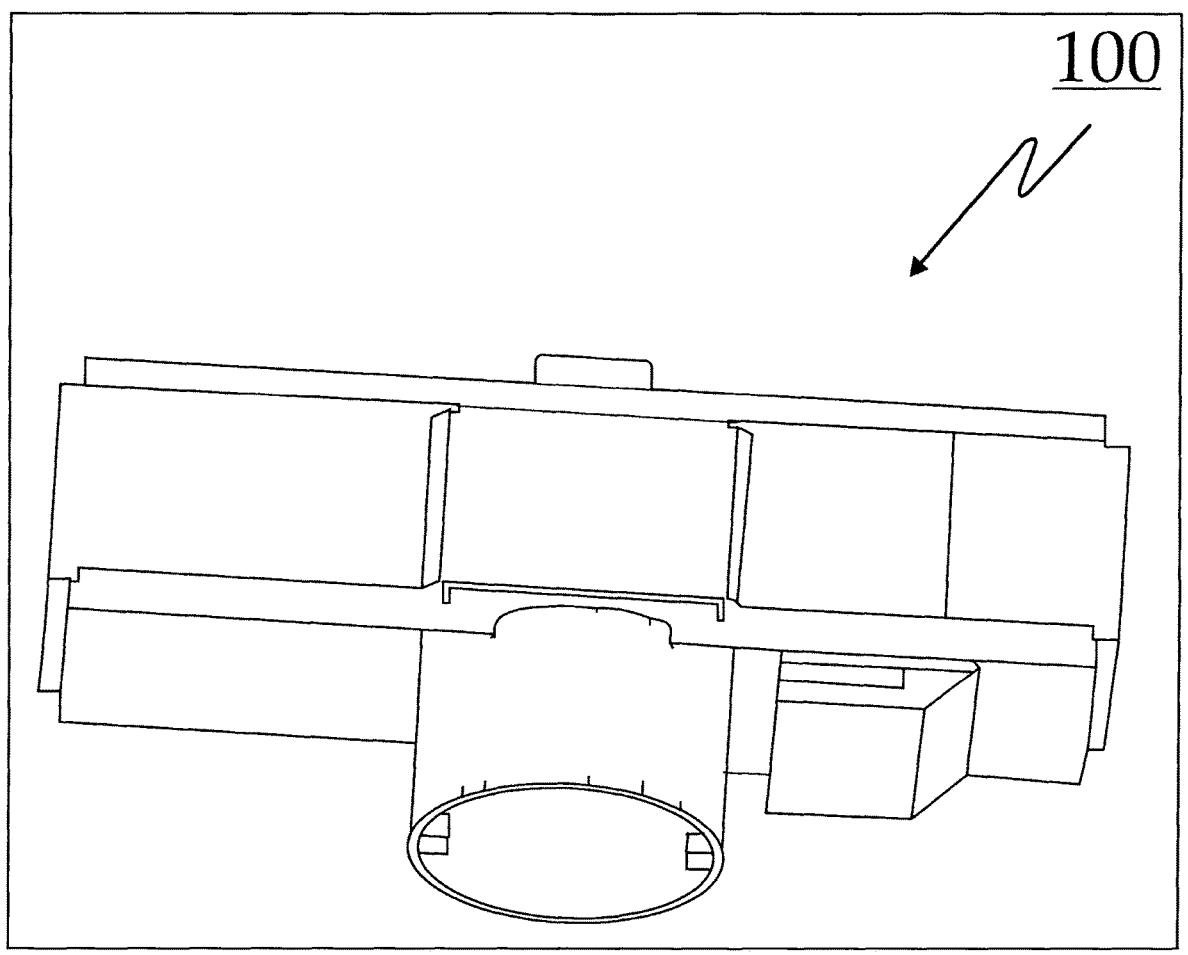

FIGS. 2A & 2B illustrate exemplary views of the recoil section 100 of the tactile simulation system 1000, in accordance with an embodiment of the invention. The recoil section 100 is configured to simulate a recoil effect of a gun. Further the recoil section 100 is detachably attached to the handheld section 200.

Figure 2C:
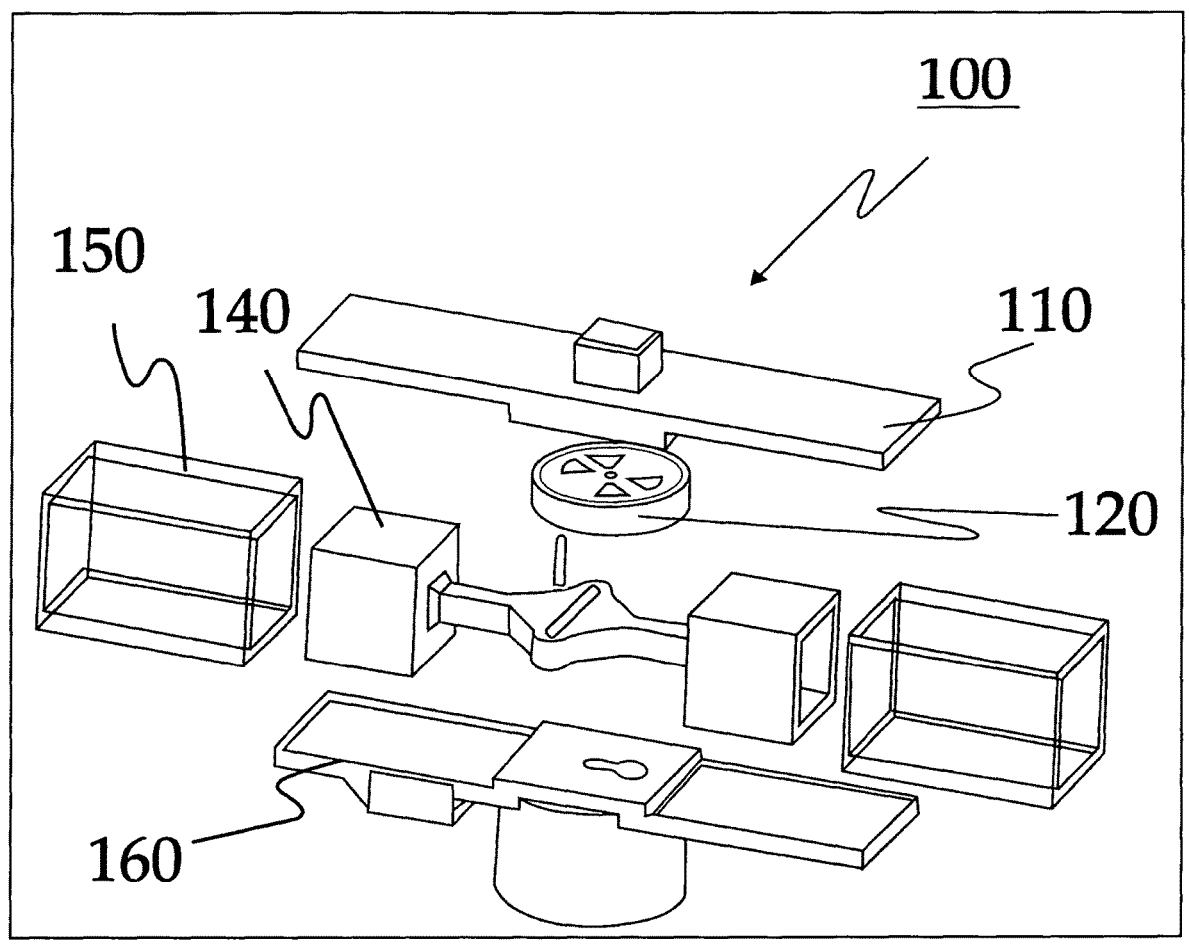
FIG. 2C & 2D illustrate exemplary exploded views of the recoil section 100 of the tactile simulation system 1000, in accordance with an embodiment of the invention.
Figure 2D:
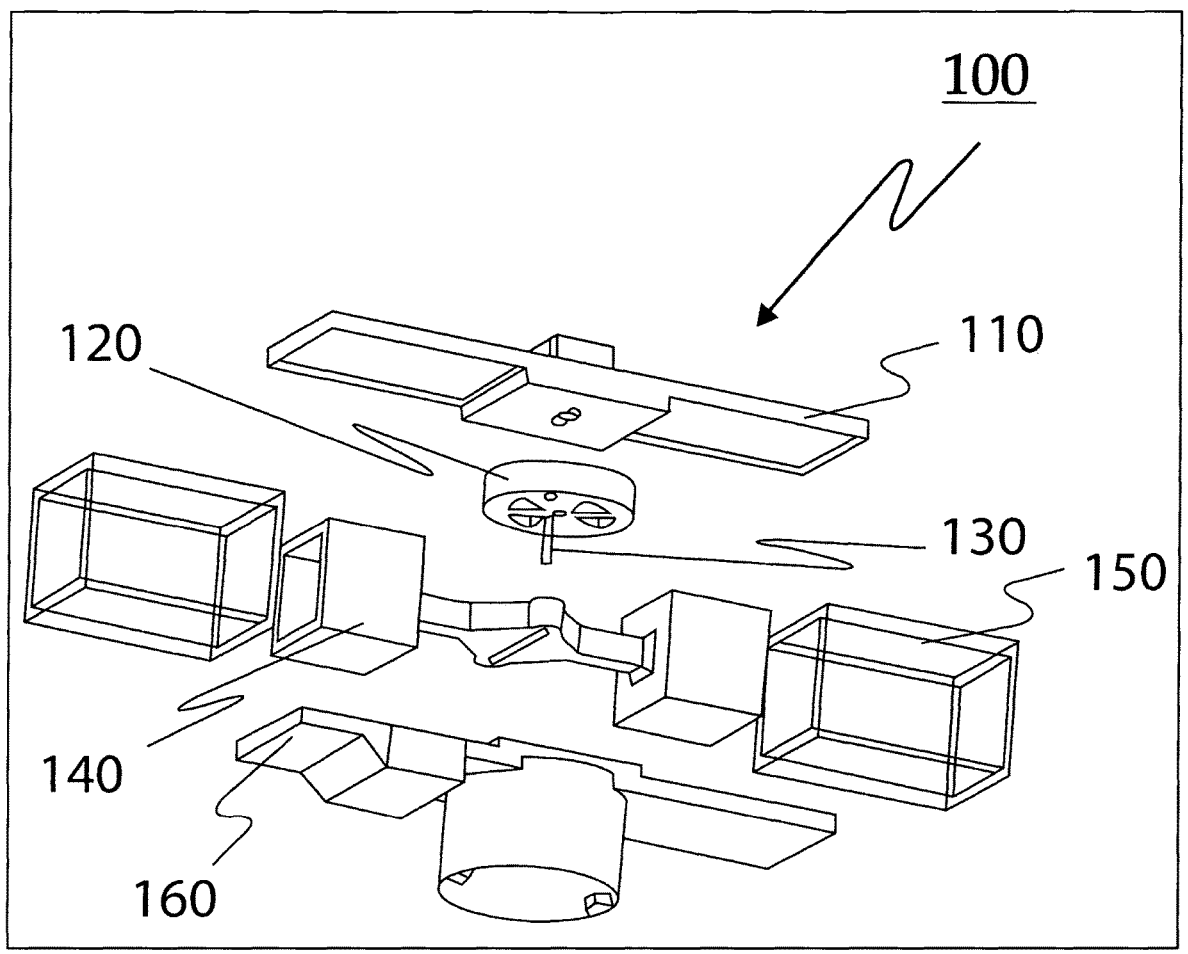
Figure 2E:
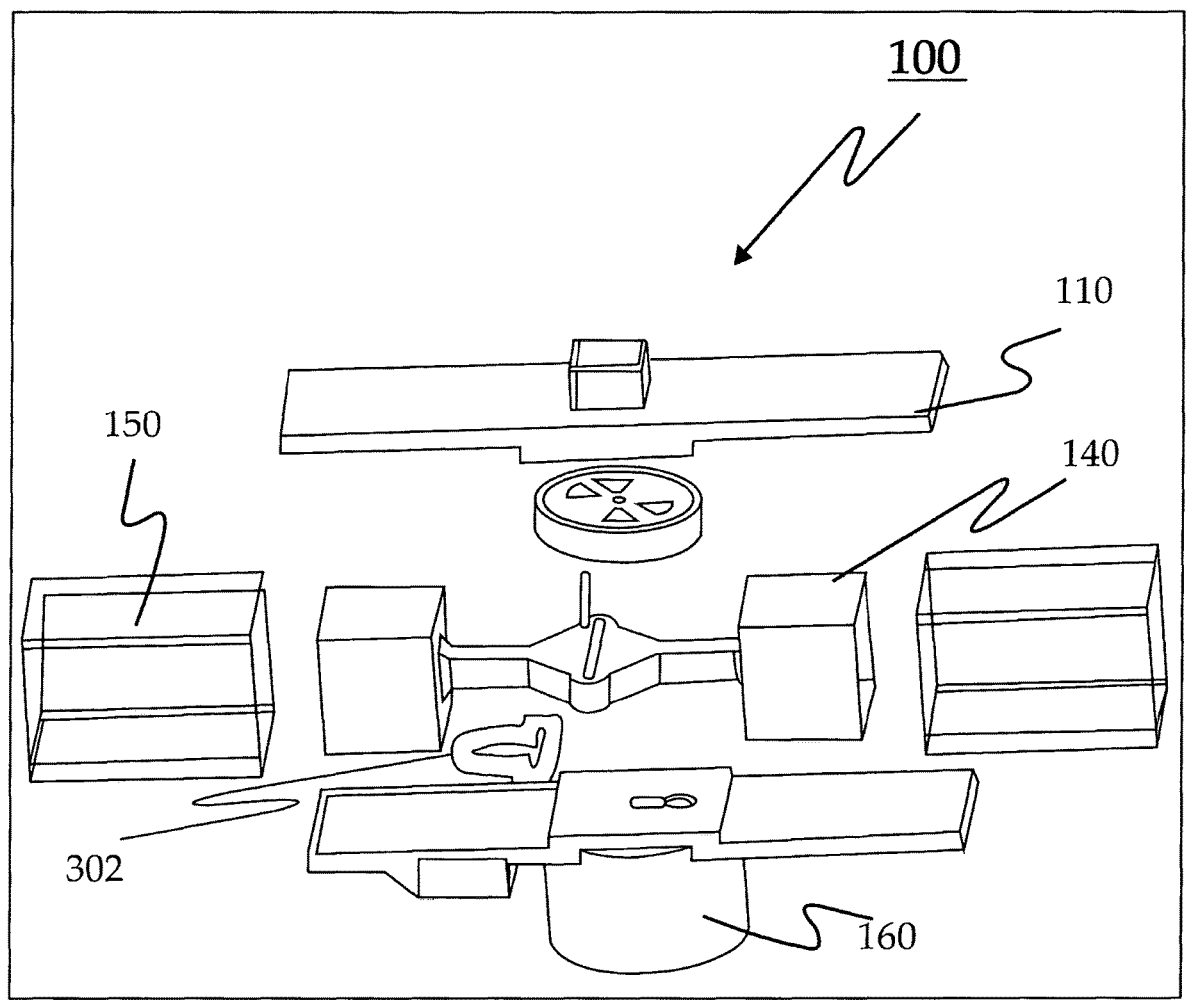
FIG. 2E illustrates an exemplary exploded view of the recoil section 100 of the tactile simulation system 1000 with a clip 302, in accordance with an embodiment of the invention.

FIG. 2C &2D illustrate exemplary exploded views of the recoil section 100 of the tactile simulation system 1000, in accordance with an embodiment of the invention. The recoil section 100 includes an actuator section 110, a wheel 120, a shaft 130, a piston section 140, a piston guide tunnel 150 and a coupling section 160. Further, FIG. 2E illustrate another exemplary exploded view of the recoil section 100 with a clip 302, in accordance with an embodiment of the invention.

Figure 3A:
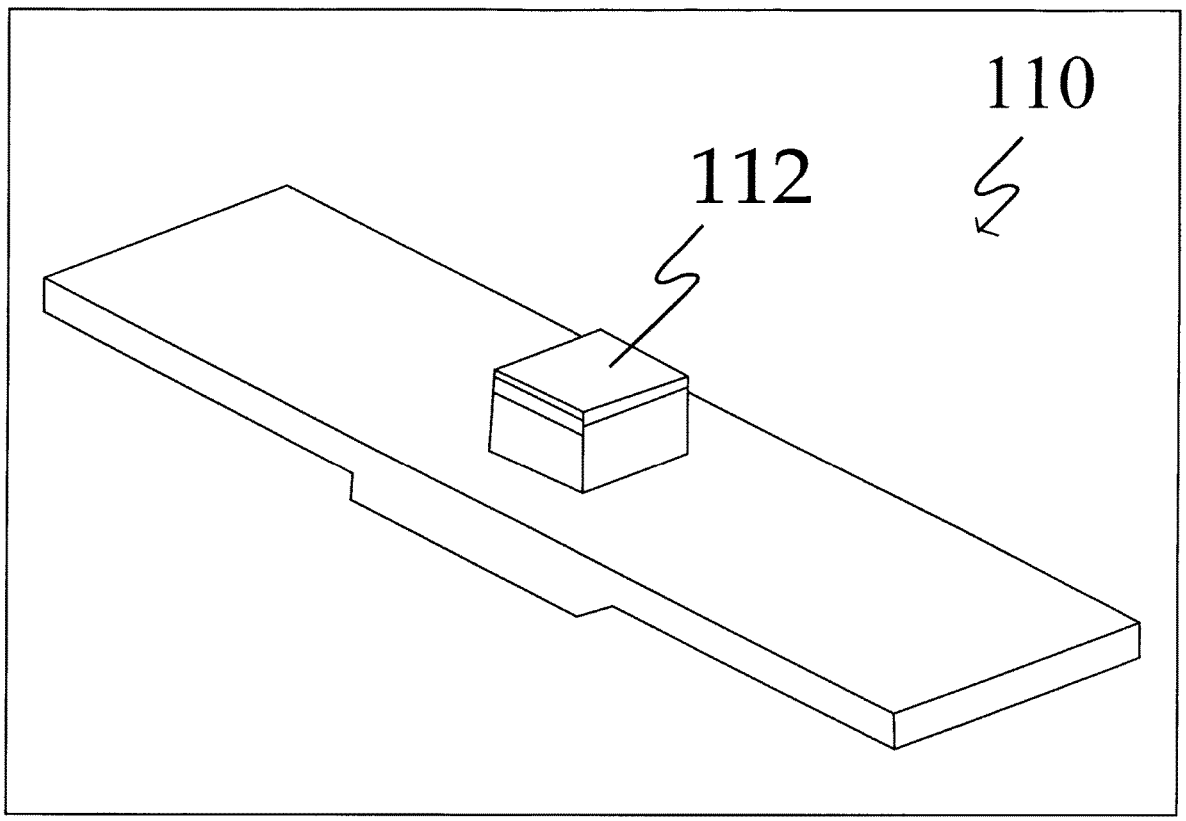
FIG. 3A illustrate an exemplary view of the top surface of the actuator section 110, in accordance with an embodiment.
Figure 3B:
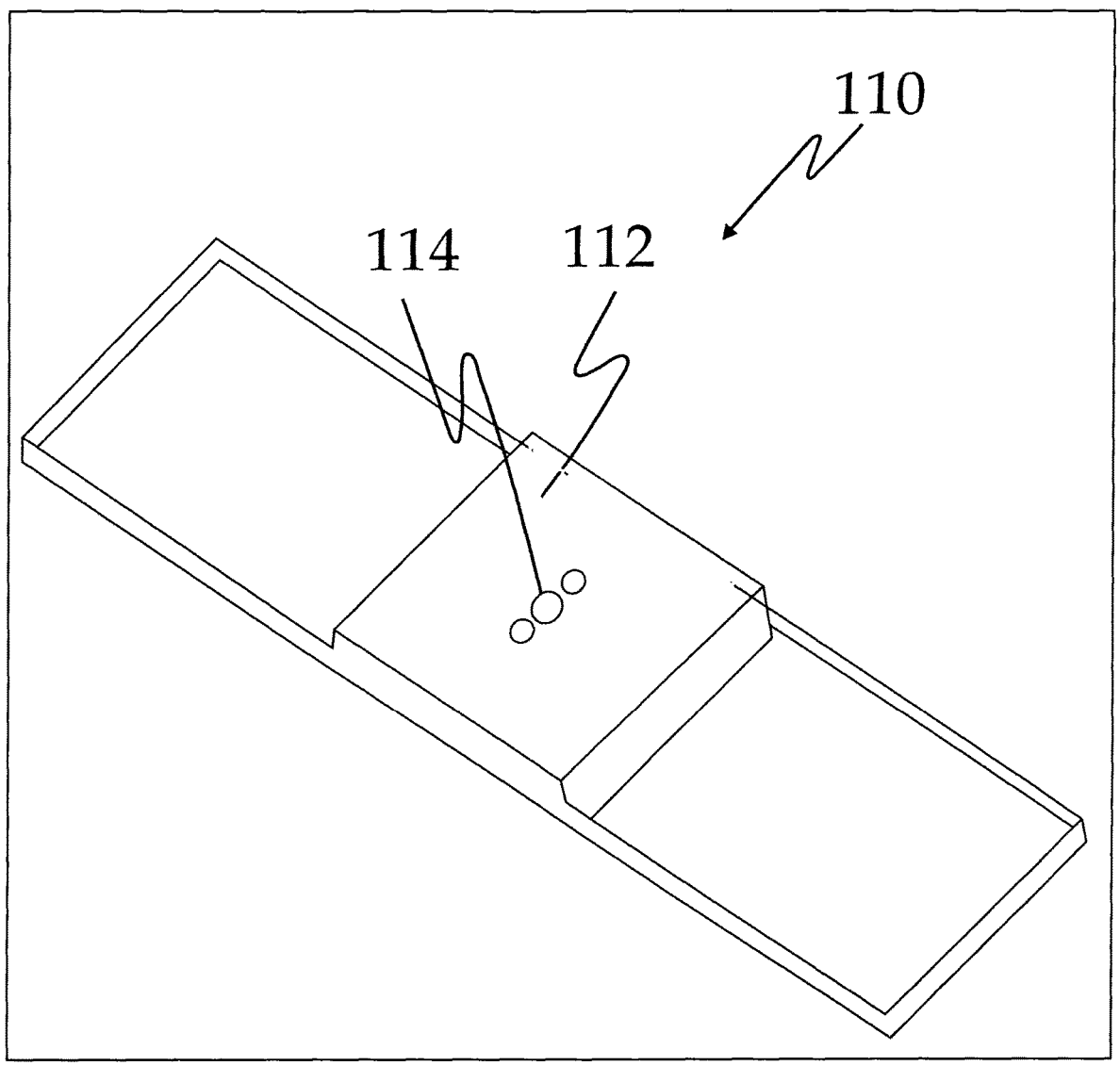
FIG. 3B illustrates an exemplary view of the bottom surface of the actuator section 110, in accordance with an embodiment.

FIG. 3A illustrate an exemplary view of the top surface of the actuator section 110, in accordance with an embodiment. As shown in the figure, the actuator section 110 incudes an actuator box 112, which includes an actuator (not shown in the figs.). Further, FIG. 3B illustrates an exemplary view of the bottom surface of the actuator section 110, in accordance with an embodiment. As shown in the figure, the actuator box 112 extends from the top surface of the actuator section 110 to the bottom surface of the actuator section 110. Further, the aperture 114 on the bottom surface of the actuator box 112 is where the actuator shaft (not shown in the figures) exists the actuator box 112. Further, the screw holes on the either side of the aperture 114 are configured to secure the actuator within the actuator box 112.

Figure 4:
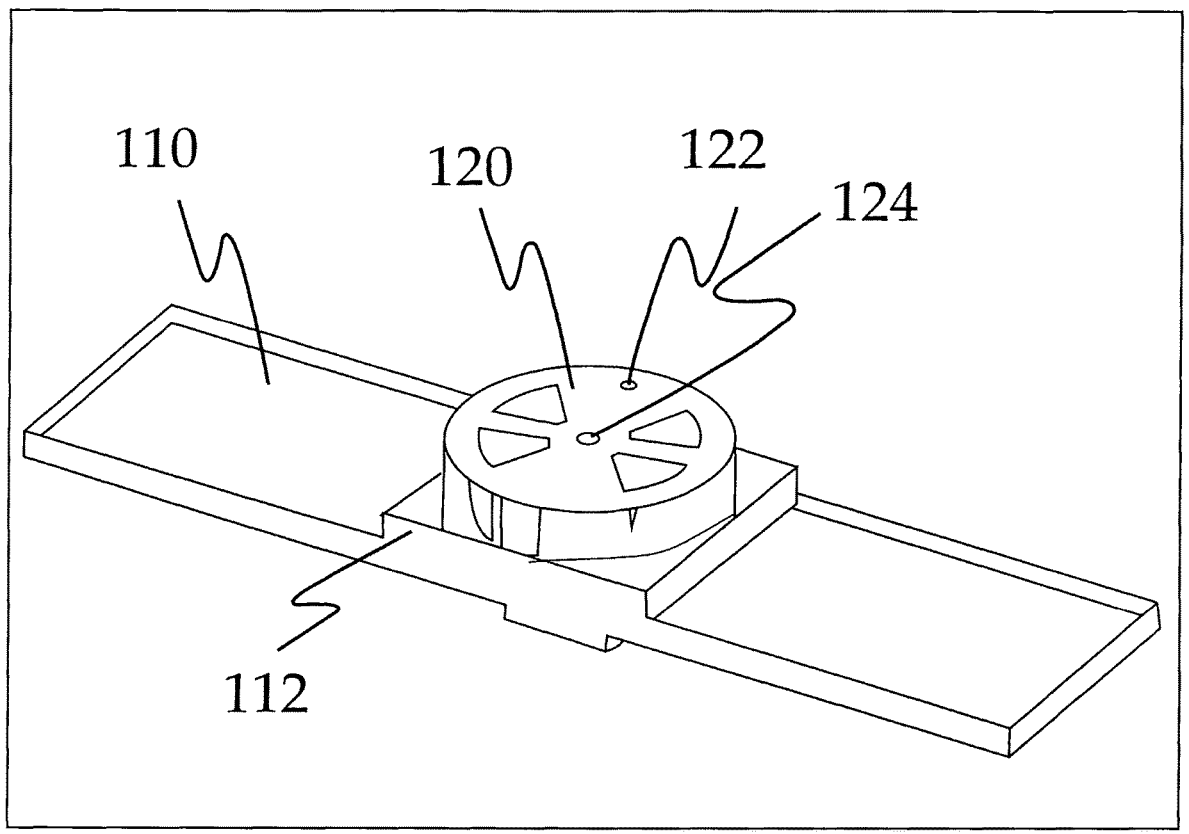
FIG. 4 illustrates an exemplary view of the wheel 120 connected to the actuator section 110 of the recoil section 100, in accordance with an embodiment of the invention.

FIG. 4 illustrates an exemplary view of the wheel 120 connected to the actuator section 110 of the recoil section 100, in accordance with an embodiment of the invention. As shown in the figure the wheel 120 is operably connected to the actuator in the actuator box 112 through the actuator shaft. The actuator shaft extents from the aperture 114 and is received by an aperture 124 at the center of the wheel 120, thereby operably connecting the actuator to the wheel 120. The wheel 120 includes an aperture 122 on the surface to the actuator box 112 and away from the center aperture 124. The aperture 122 is on the surface of the wheel 120 which is facing the piston section 140.

Figure 5:
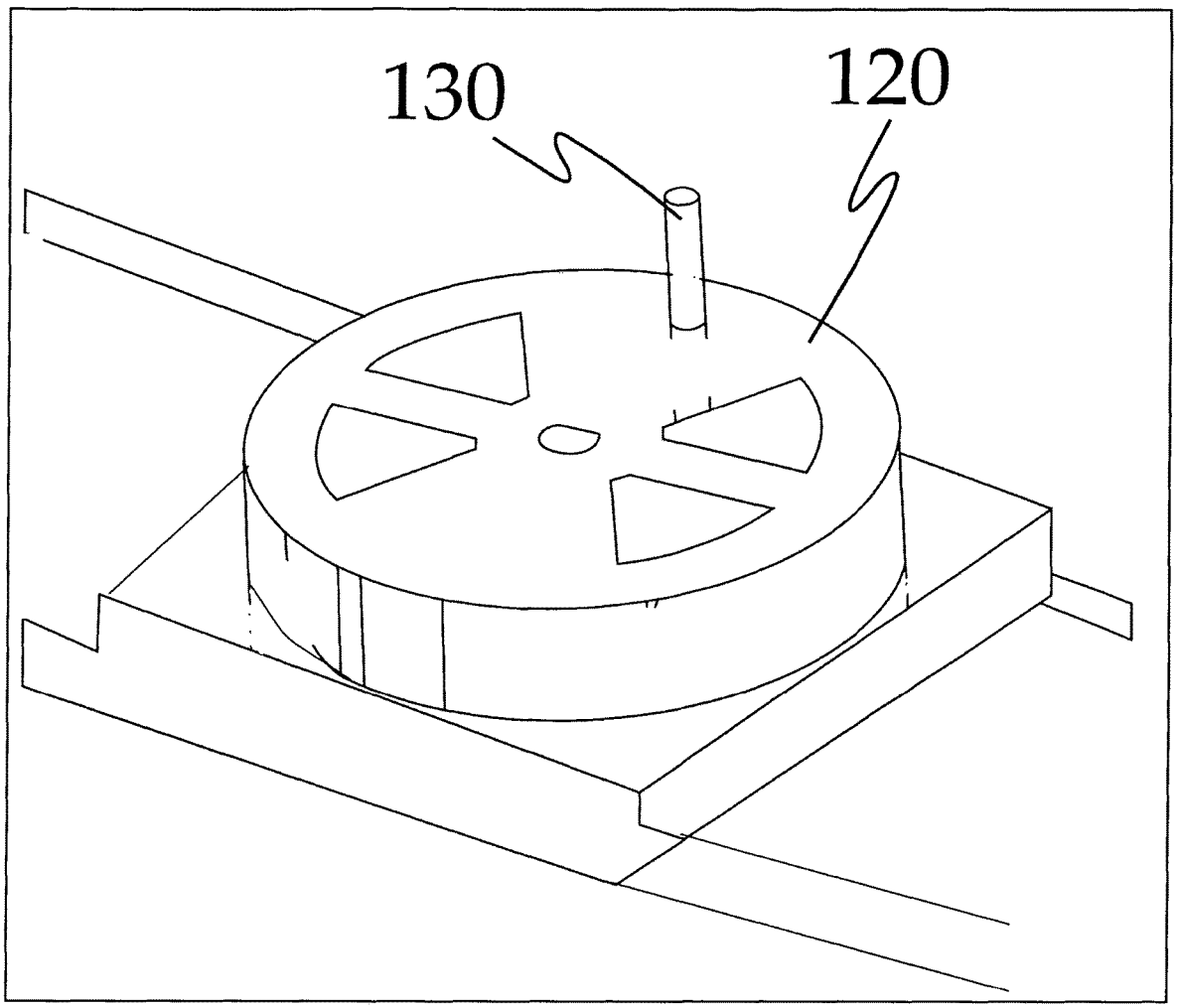
FIG. 5 illustrates an exemplary view of the shaft 130 connected to the wheel 120 of the recoil section 100, in accordance with an embodiment of the invention.

FIG. 5 illustrates an exemplary view of the shaft 130 connected to the wheel 120 of the recoil section 100, in accordance with an embodiment of the invention. As depicted in the figure, the shaft 130 is connected to the wheel 130 through the aperture 122 on the surface of the wheel 120.

Figure 6A:
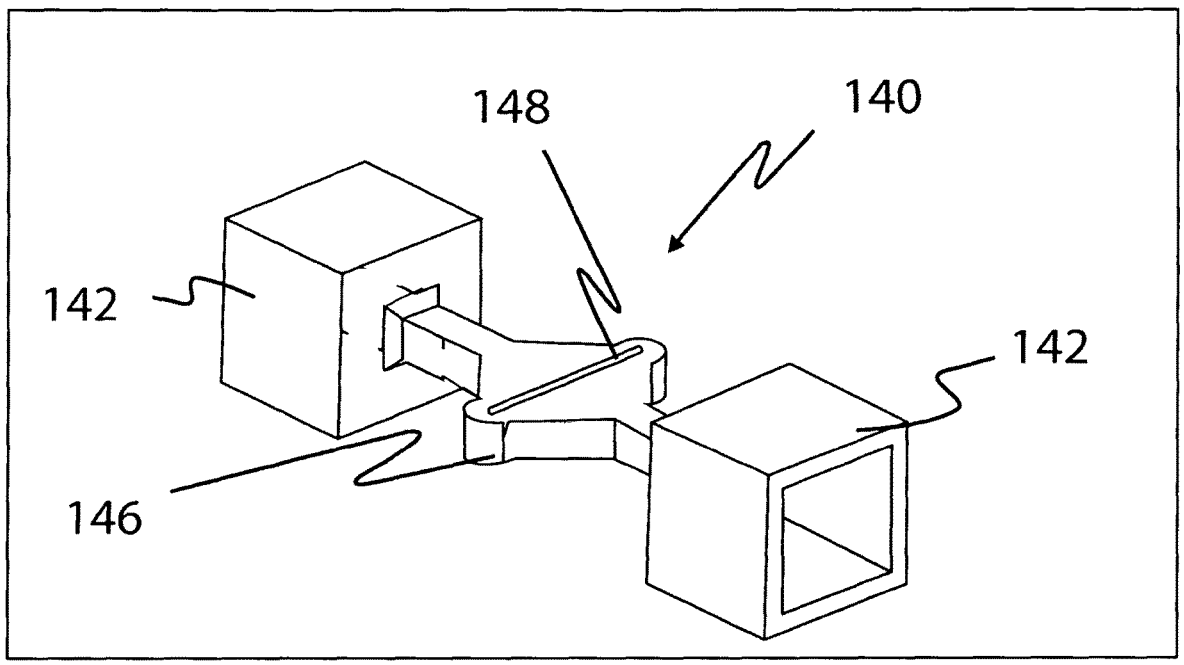
FIGS. 6A & 6B illustrate exemplary views of the piston section 140 of the recoil section 110, in accordance with an embodiment of the invention.
Figure 6B:
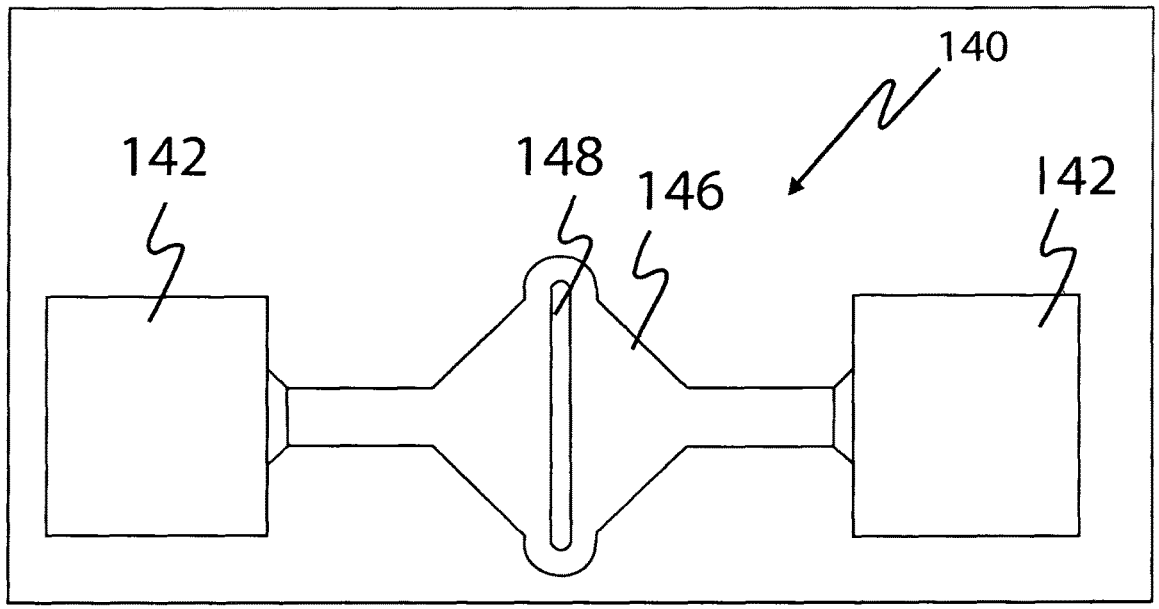

FIGS. 6A & 6B illustrate exemplary views of the piston section 140 of the recoil section 110, in accordance with an embodiment of the invention. The piston section 140 includes a slot rail section 146 and piston heads 142 on either side of the slot rail section 146. The slot rail section 146 includes a slot rail 148, which is a linear slot perpendicular to the axis defined by joining the position of both the piston heads 142. The width of the slot rail 148 is equal to greater than the diameter of the shaft 130.

Figure 7:
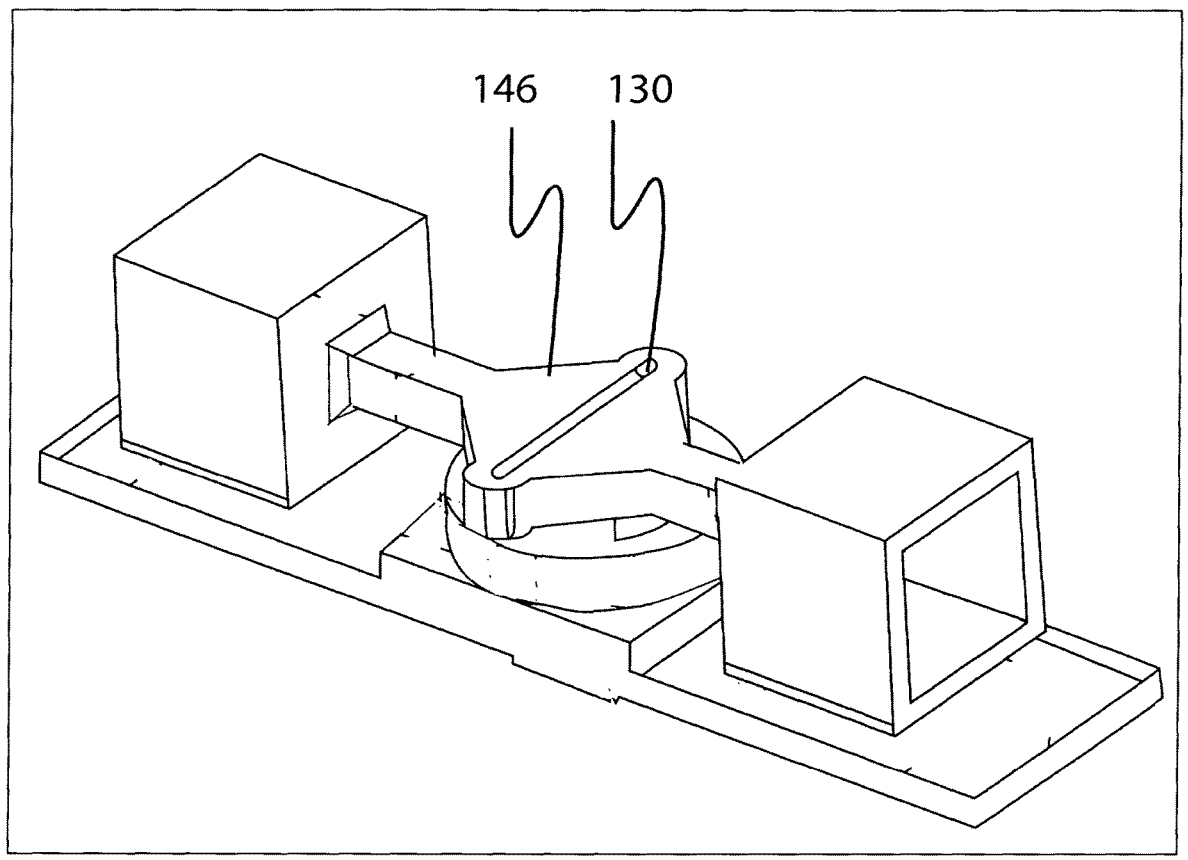
FIG. 7 illustrates an exemplary view of the piston section 140 connected to the wheel 120 of the recoil section 110, in accordance with an embodiment of the invention.

The piston section 140 is movably connected to the wheel 120 through the shaft 130. One end of the shaft 130 is secured in the aperture 122 of the wheel 120, while the other end is received by the slot rail 148 of the slot rail section 146, as depicted in FIG. 7. As, may be observed from the figures the piston heads 142 are hallow. Further, the hallow part of the piston heads 142 may include steel or other metals or an alloy thereof to act as weight, in accordance with an embodiment.

Figure 8:
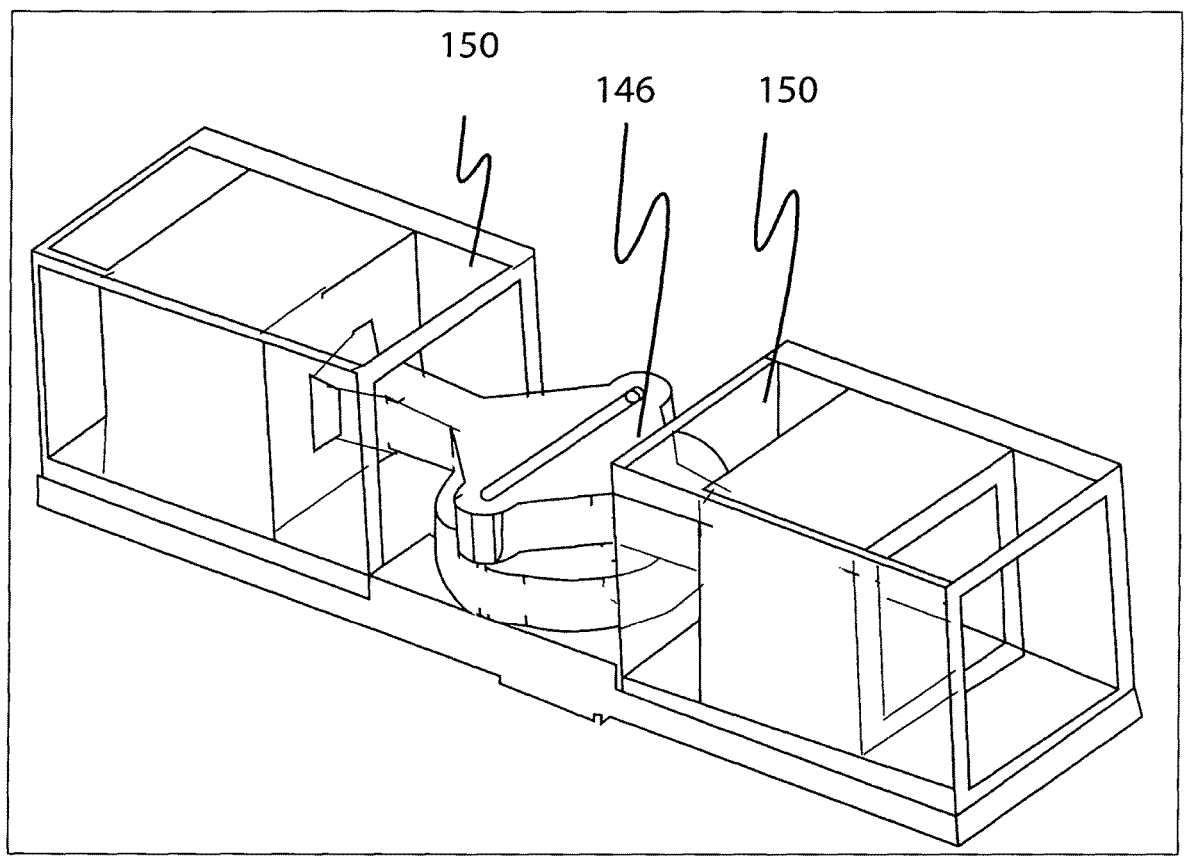
FIG. 8 illustrates an exemplary view of piston guide tunnel 150 of the recoil section 100, in accordance with an embodiment of the invention.

FIG. 8 illustrates an exemplary view of piston guide tunnel 150 of the recoil section 100, in accordance with an embodiment of the invention. The piston heads 142 are secured in the piston guide tunnel 150 such that the piston heads 142 may slide alongside the internal wall of the piston guide tunnel 150, as shown in the figures.

Figure 9A:
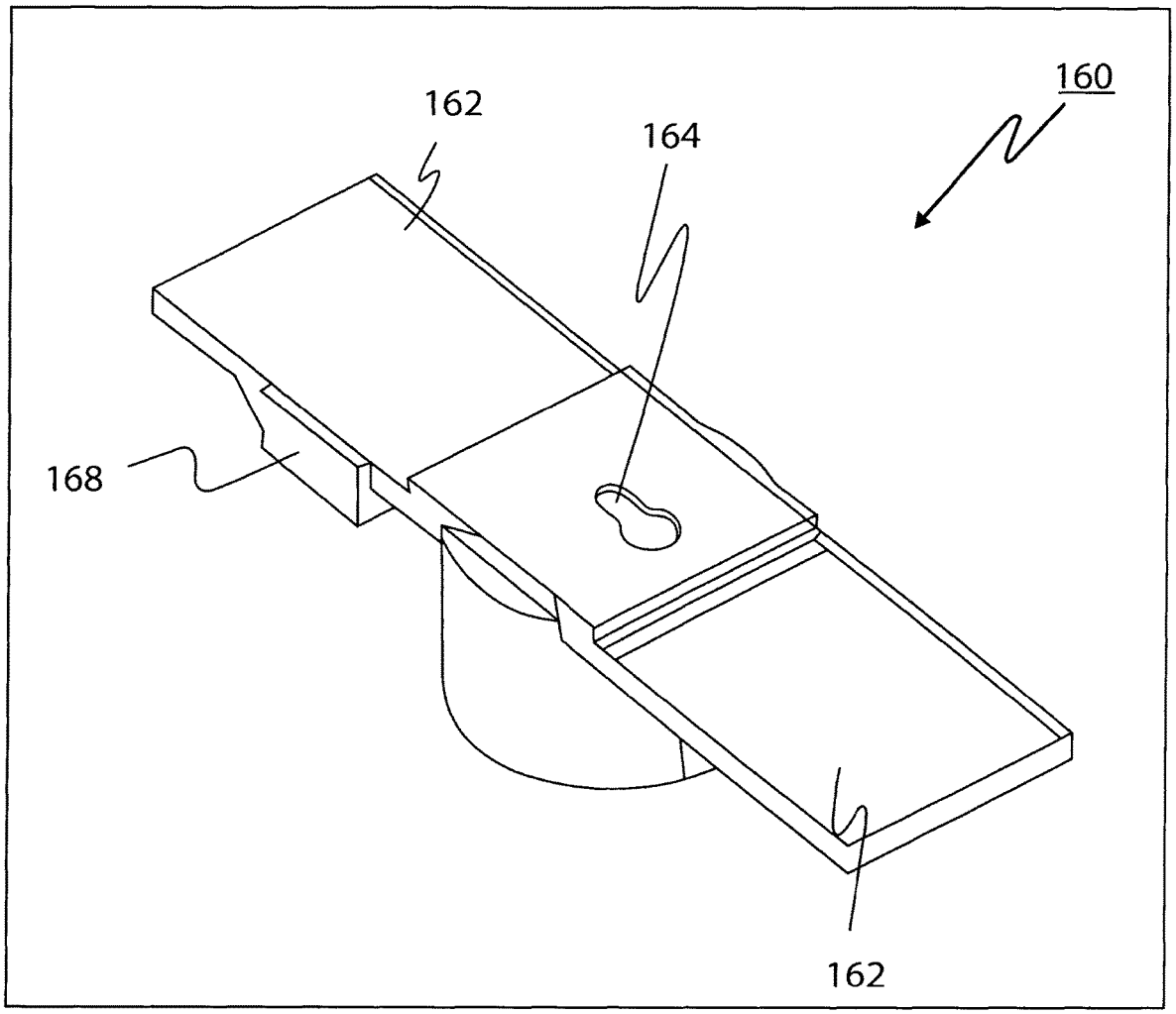
FIG. 9A illustrates an exemplary view of a top surface of a coupling section 160 of the recoil section 100, in accordance with an embodiment of the invention.

FIG. 9A illustrates an exemplary view of a top surface of a coupling section 160 of the recoil section 100, in accordance with an embodiment of the invention. The base 162 of the coupling section 160 may secure the position of the piston guide tunnel 150. The opening 164 may hold an electrical male connector (not shown in the figs.). Further, the clip 302 may be held by an anchor section 168 through the slot 169 as depicted in the FIG. 9B.

Figure 9B:
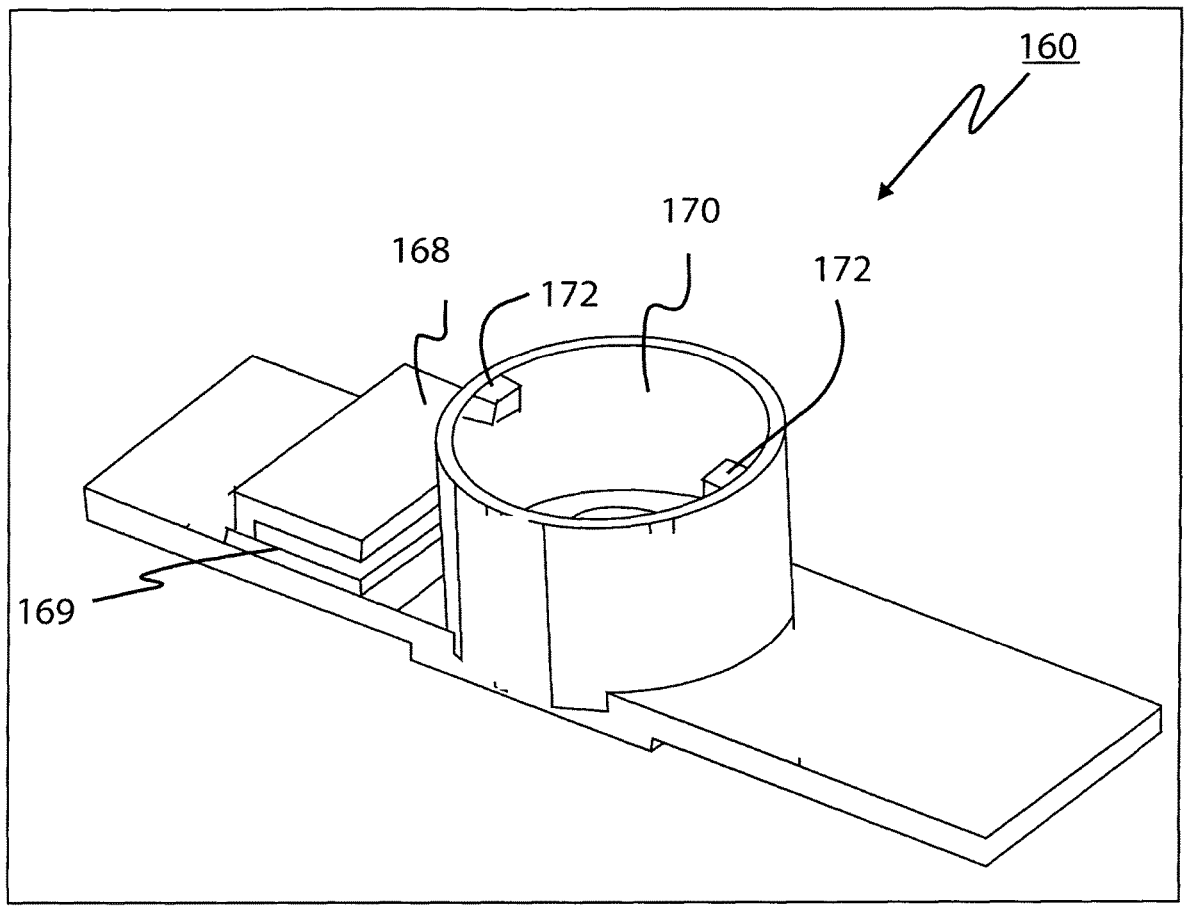
FIG. 9B illustrates an exemplary view of a bottom surface of a coupling section 160 of the recoil section 100, in accordance with an embodiment of the invention.

FIG. 9B illustrates an exemplary view of a bottom surface of a coupling section 160 of the recoil section 100, in accordance with an embodiment of the invention. The handgrip section 200 may be removably attached to the recoil section 100 through the recess 170 and locking male slot 172.

FIGS. 10A-10E illustrate exemplary views of the recoil section 100 to demonstrate the movement of the piston section 140, in accordance with an embodiment of the invention. Let the position of the piston head 142, as illustrated in the FIG. 10A be the initial position. Further, when the actuator in the actuator section 110 is turned ON by the controller 1004 the wheel 120 rotates and the piston head is pushed towards the extreme right by the shaft 130. The piston head 142 moves along the inner wall of the piston guide tunnel 150 towards the extreme right as shown in the FIG. 10B.

Figure 10A:
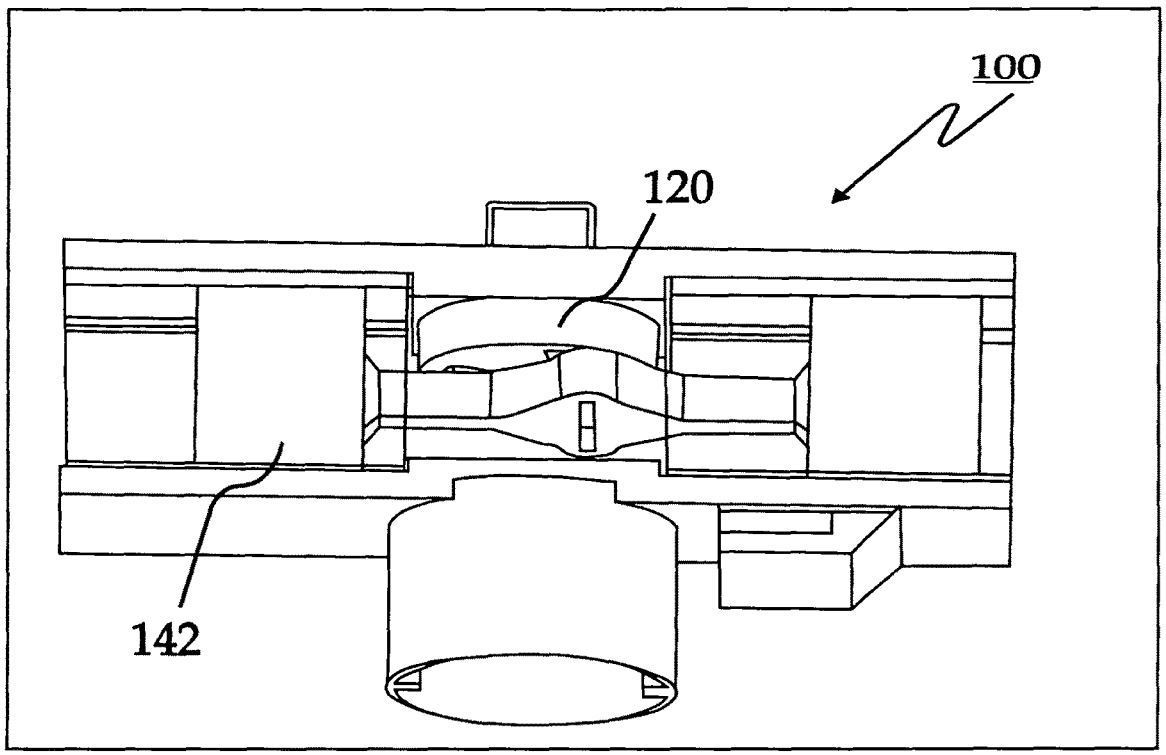
FIGS. 10A-10D illustrate exemplary views of the recoil section 100 to demonstrate the movement of the piston section 140, in accordance with an embodiment of the invention.
Figure 10B:
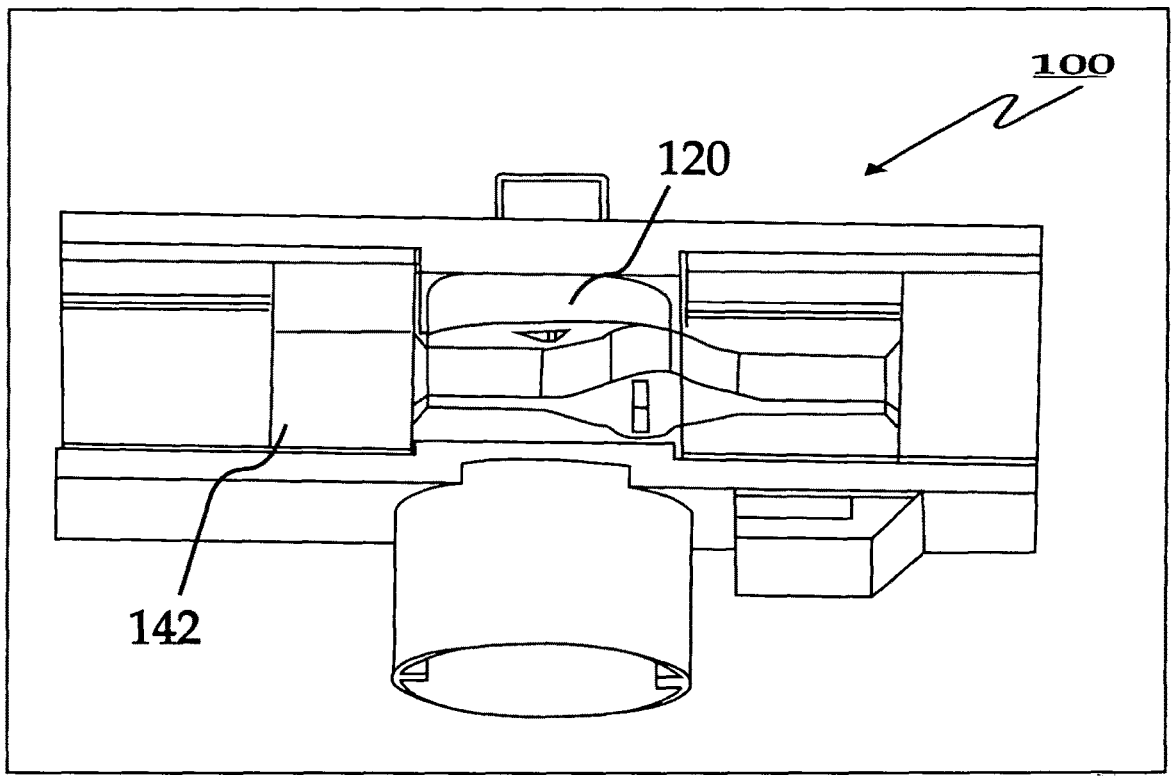
Figure 10C:
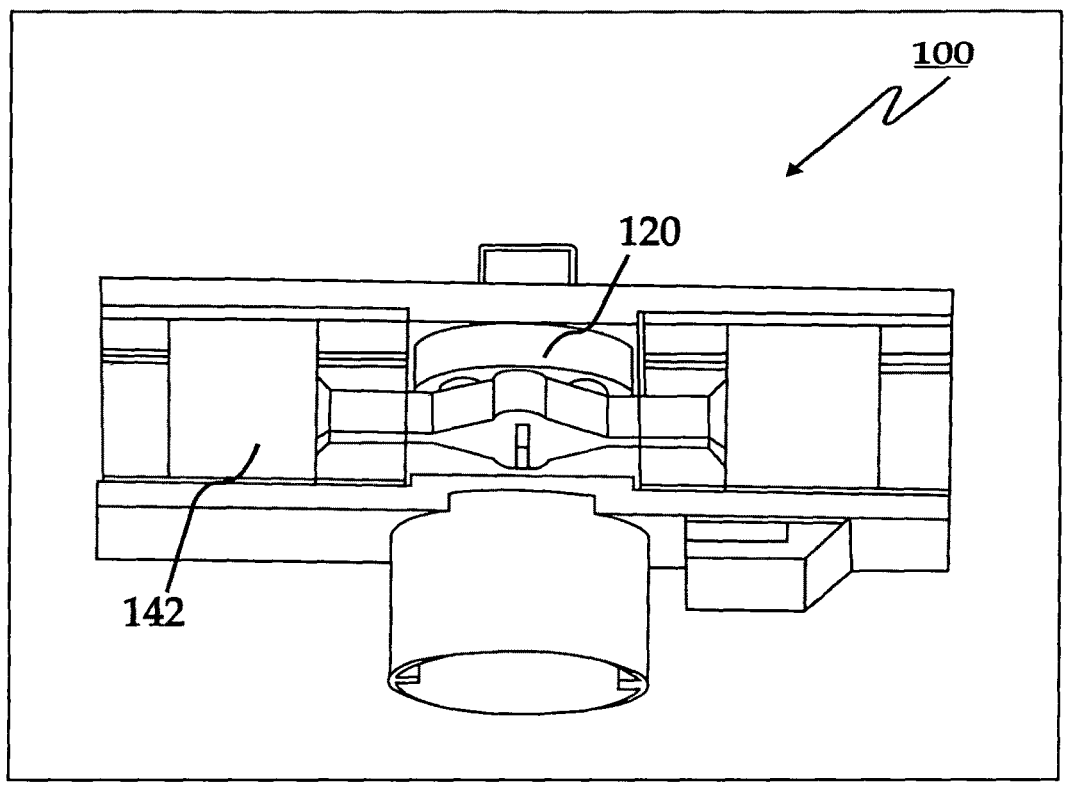
Figure 10D:
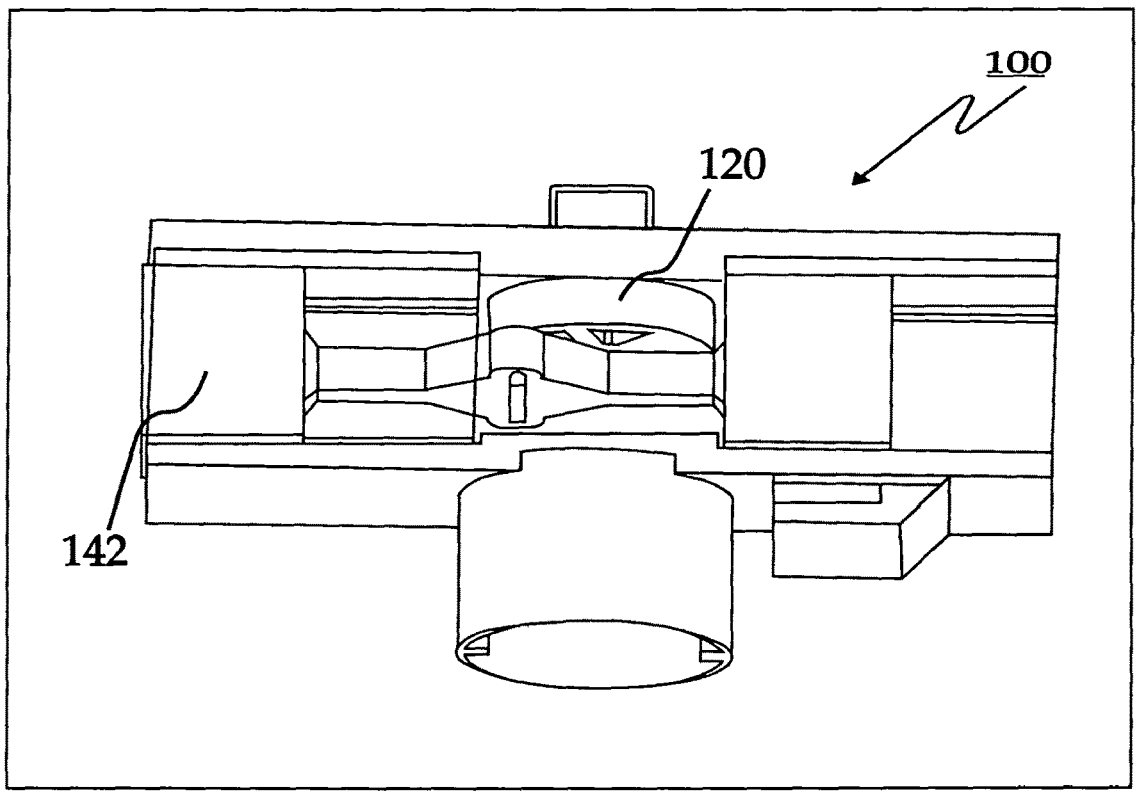

On further rotation of the wheel 120, the shaft 130 slides along the slot rail 148 moving the piston head 142 towards the left as shown in the FIG. 10C. The piston head 142 moves along the inner wall of the piston guide tunnel 150 towards the left as shown in the FIG. 10C. Thereafter, on further rotation of the wheel 120 by the actuator the shaft 130 slides upwards along the slot rail 148 moving the piston head 142 towards the extreme left as shown in the FIG. 10D. The piston head 142 moves along the inner wall of the piston guide tunnel 150 towards the extreme left as shown in the FIG. 10D.

In an embodiment, for one complete rotation of the wheel 120, the shaft 130 moves the piston head 142 from an initial position to extreme right, and then to the extreme right along the inner wall of the piston guide tunnel 150. The abrupt movement of the piston section 140 is the primary source of impact vibration to have the subject feel a recoil effect, which simulates the effect of firing a gun.

Figure 11A:
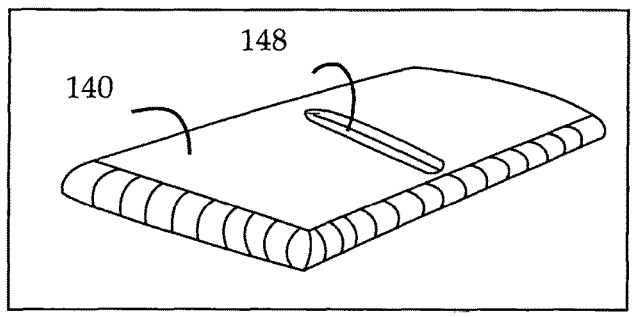
FIG. 11A illustrates an alternative design of a piston section 140 of the recoil section 100, in accordance with an embodiment of the invention.
Figure 11B:
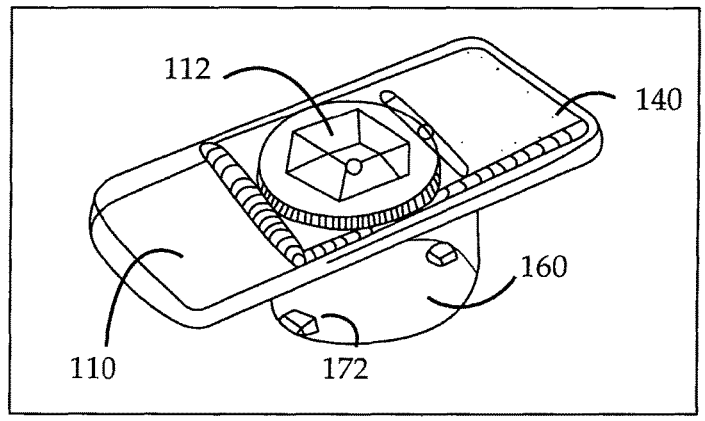
FIG. 11B illustrates an exemplary transparent view of the recoil section 100 with piston section 140 of FIG. 11A, in accordance with an embodiment of the invention.
Figure 11C:
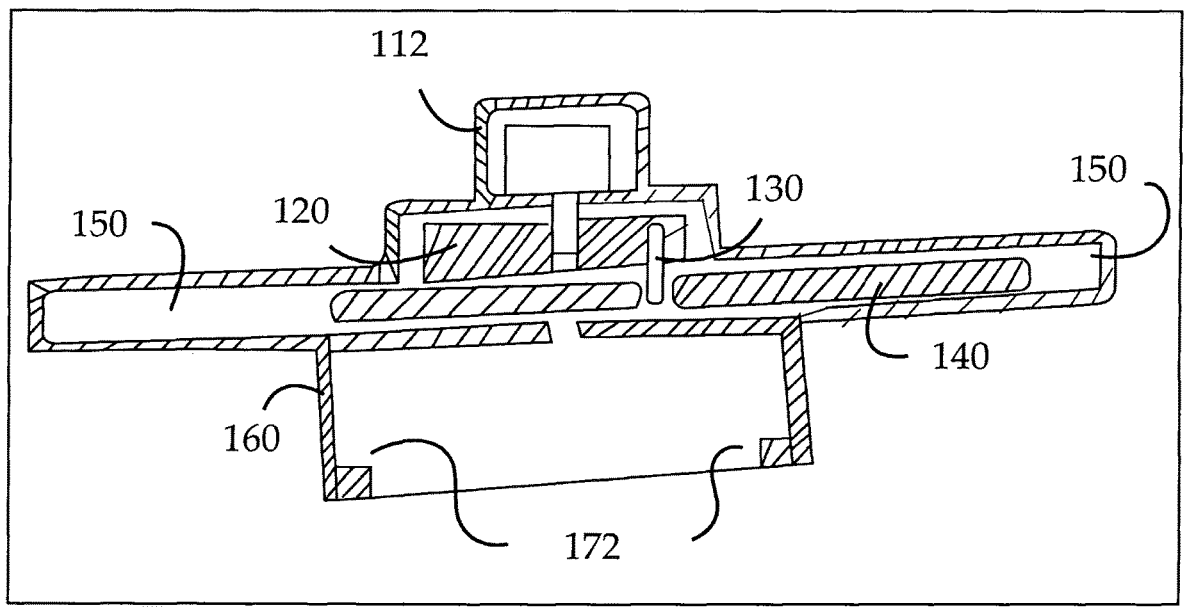
FIG. 11C illustrates sectional view of the recoil section 100 of FIG. 11B, in accordance with an embodiment of the invention.

FIG. 11A illustrates a piston section 140 of the recoil section 100, in accordance with an alternative embodiment of the invention. In the instant embodiment, the piston section 140 is a metal weight with positioned in the piston guide tunnel 150 as shown in FIG. 11C. The piston section 140 moves along the internal wall of the piston guide tunnel 150 while the shaft 130 moves along the slot rail 148, as shown in FIG. 11B.

Figure 12A:
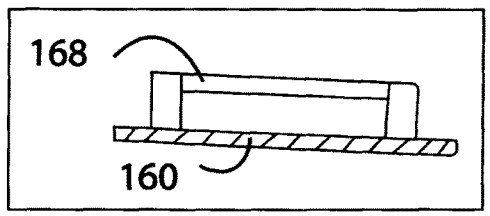
FIGS. 12A & 12B illustrate an anchor section 168 on the bottom of the coupling section 160 of a different design, in accordance with an embodiment of the invention.
Figure 13A:
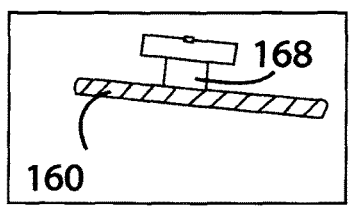
FIGS. 13A & 13B illustrate an anchor section 168 which is of button shape on the bottom of the coupling section 160, in accordance with an embodiment of the invention.
Figure 14A:
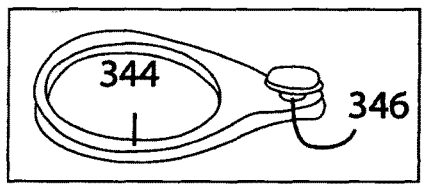
FIGS. 14A & 14B illustrate a ring 344 and button 346 design that is anchored to the coupling section 160, in accordance with an embodiment of the invention.
Figure 15A:
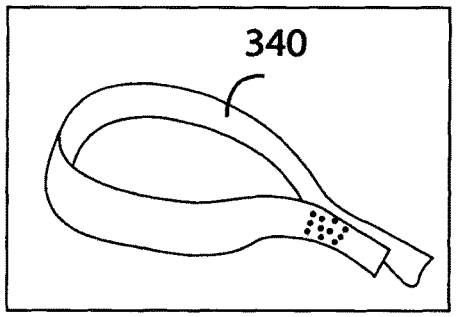
FIGS. 15A & 15B illustrate a hook and loop faster 342 and loop end of the strap 340, in accordance with an embodiment of the invention.
Figure 12B:
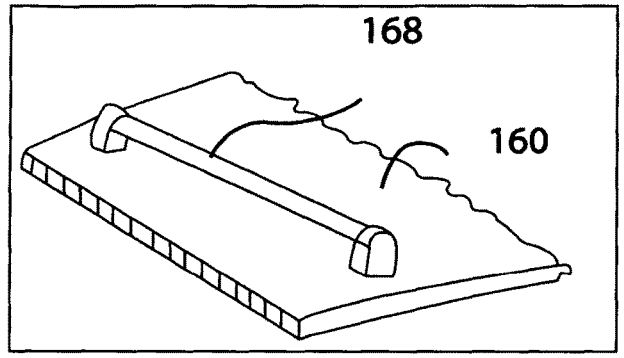
Figure 13B:
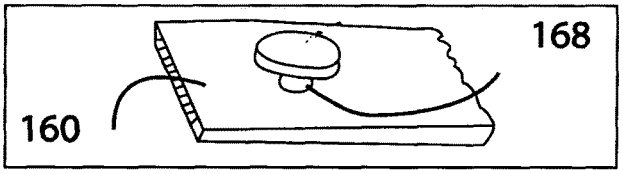
Figure 14B:
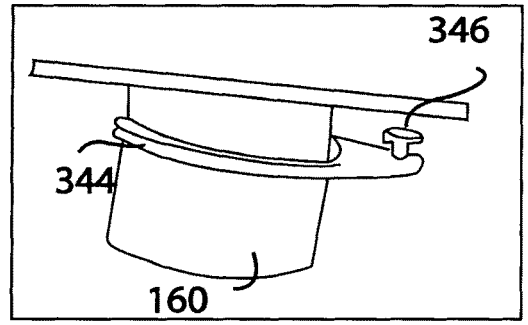
Figure 15B:
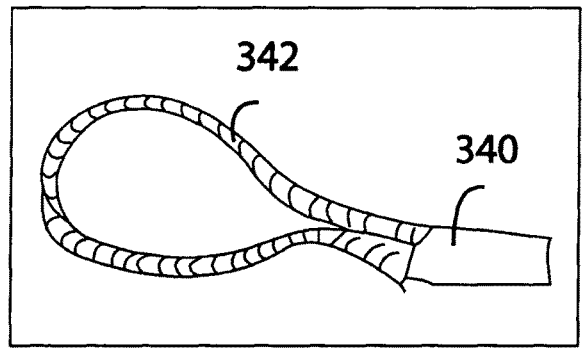

FIG. 12A-15B illustrate exemplary ways to couple handgrip section 200 with the recoil section 100, in accordance with various embodiments. FIGS. 12A & 12B illustrates an anchor section 168 on the bottom of the coupling section 160 of different design as shown in the figures. FIGS. 13A & 13B illustrates an anchor section 168 which is of button shape on the bottom of the coupling section 160 of an alternative embodiment, as shown in the figures. FIGS. 14A & 14B illustrates a ring 344 and button 346 design that is anchored to the coupling section 160, of an alternative embodiment, as shown in the figures. FIGS. 15A & 15B illustrates a hook and loop faster 342 and loop end of the strap 340 in accordance to an alternative embodiment, as shown in the figures.

Figure 16:
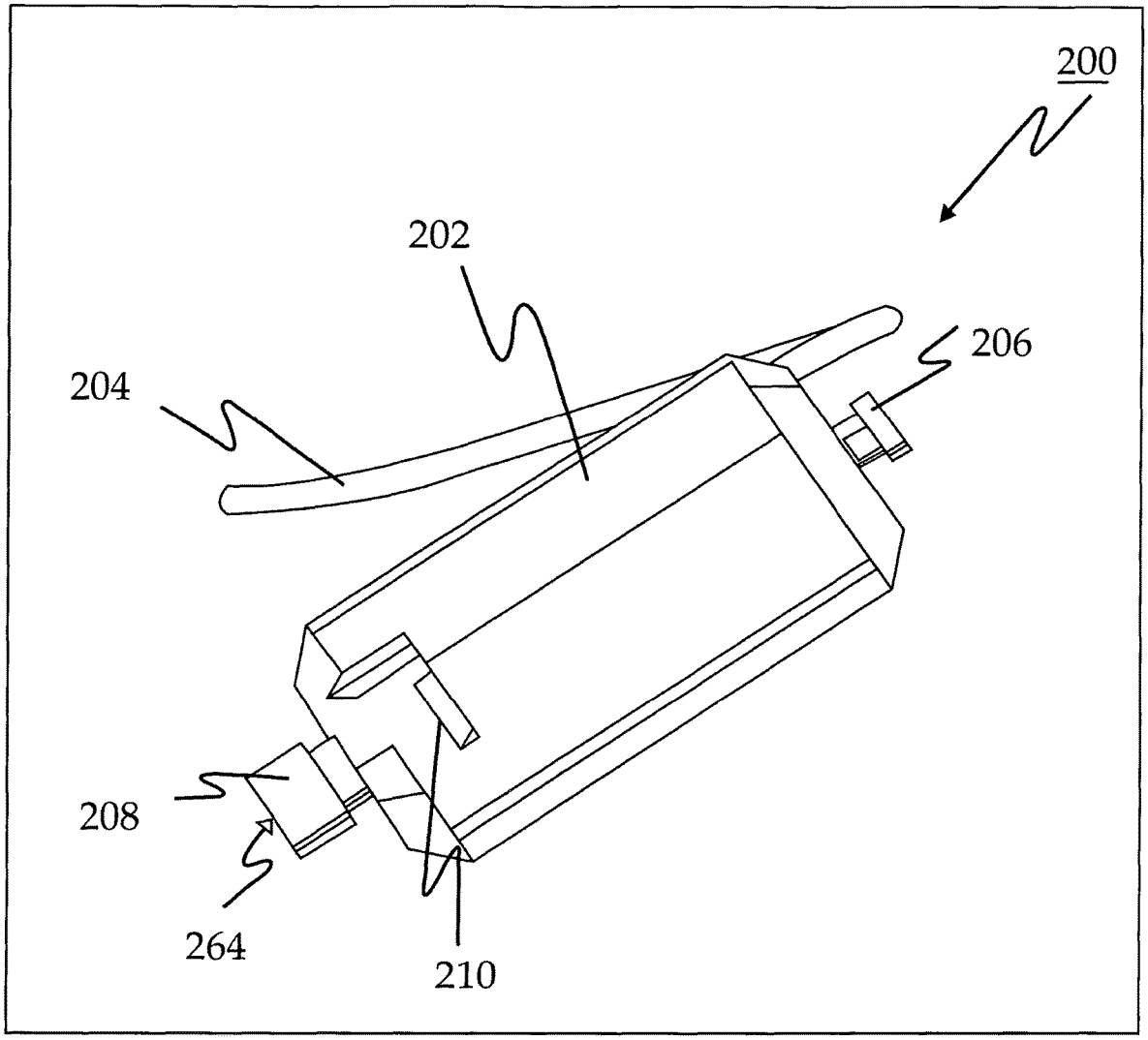
FIG. 16 illustrates an exemplary view of the handgrip section 200 in accordance with an embodiment of the invention.

FIG. 16 illustrates an exemplary view of the handgrip section 200 in accordance with an embodiment of the invention. The handgrip section 200 includes an outer shell 202, at least one vibration motor (not shown in the figs.), a male connector 206, a recoil connector 208, a locking female slot 210 and a cable 204.

The at least one vibration motor is secured inside the outer shell 202, and the cable 204 is connected to the at least one vibration motor such that it's operation may be controlled by the controller 1004. In an embodiment, there may be 3 vibration motors secured within the outer shell 202, where the level of vibration may be varied by operating one or more vibration motors based on the frequency of a vibration to be simulated by the handgrip section 200.

The recoil section 100 is connected to the handgrip section 200 through the locking female slot 210. When the coupling section 160 of the recoil section 100 and the recoil connector 208 are aligned such that the locking male slot 172 and the looking female slot 210 are aligned and pressed against each other, then the recoil section 100 is secured to the handgrip section 200. In an embodiment, the circumference of the handgrip section 200 is less than the circumference of the recess 170 of the coupling section 160, thereby allowing easy coupling of the recoil section 100 and the handgrip section 200 of the tactile simulation system 1000. Further the opening 164 of the recoil section 100 is aligned with the opening 264 of the handgrip section 200 upon coupling of the recoil section 100 and the handgrip section 200. One of those openings 164 or 264 may include a electric male connector (not shown in figs.) while the other would include an electric female connector (not shown in figs.) in order to establish a secure connection.

Figure 17:
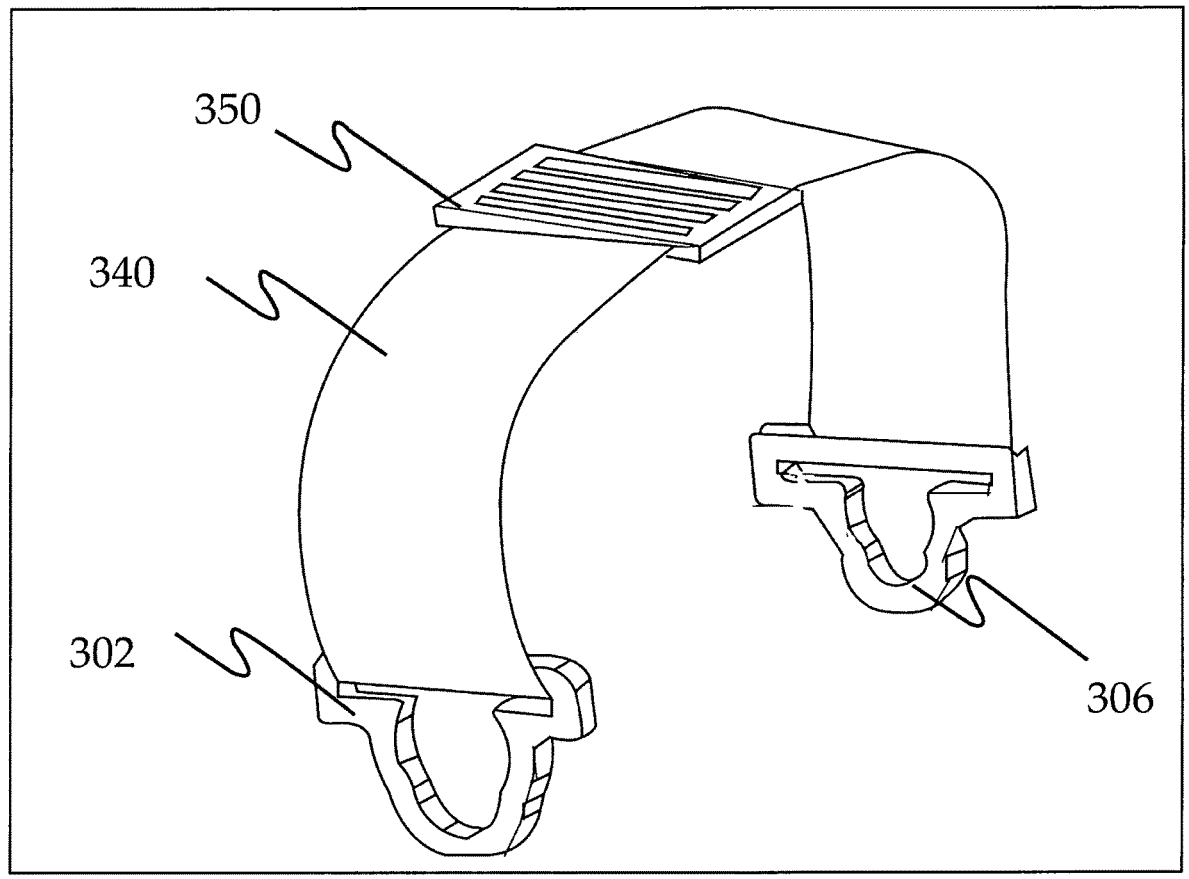
FIG. 17 illustrates an exemplary view of the strap 340 with clip 302 and clip 306, in accordance with an embodiment of the invention.

Referring to FIG. 17, the male connector 206 of the handgrip section 200 is secured to the clip 306, while the clip 302 is secured in the slot 169 of the coupling section 160 (refer to FIGS. 9B and 17). Further, the strap 340 may be secured to the hand of a subject. The strap 340 includes a strap adjuster 350 allowing one end of the strap 340 to be adjusted as per the subjects need. The strap adjuster 350 includes multiple beams which allows the strap 340 to be looped between the beams, so as to adjust according to the subjects need.

Figure 18A:
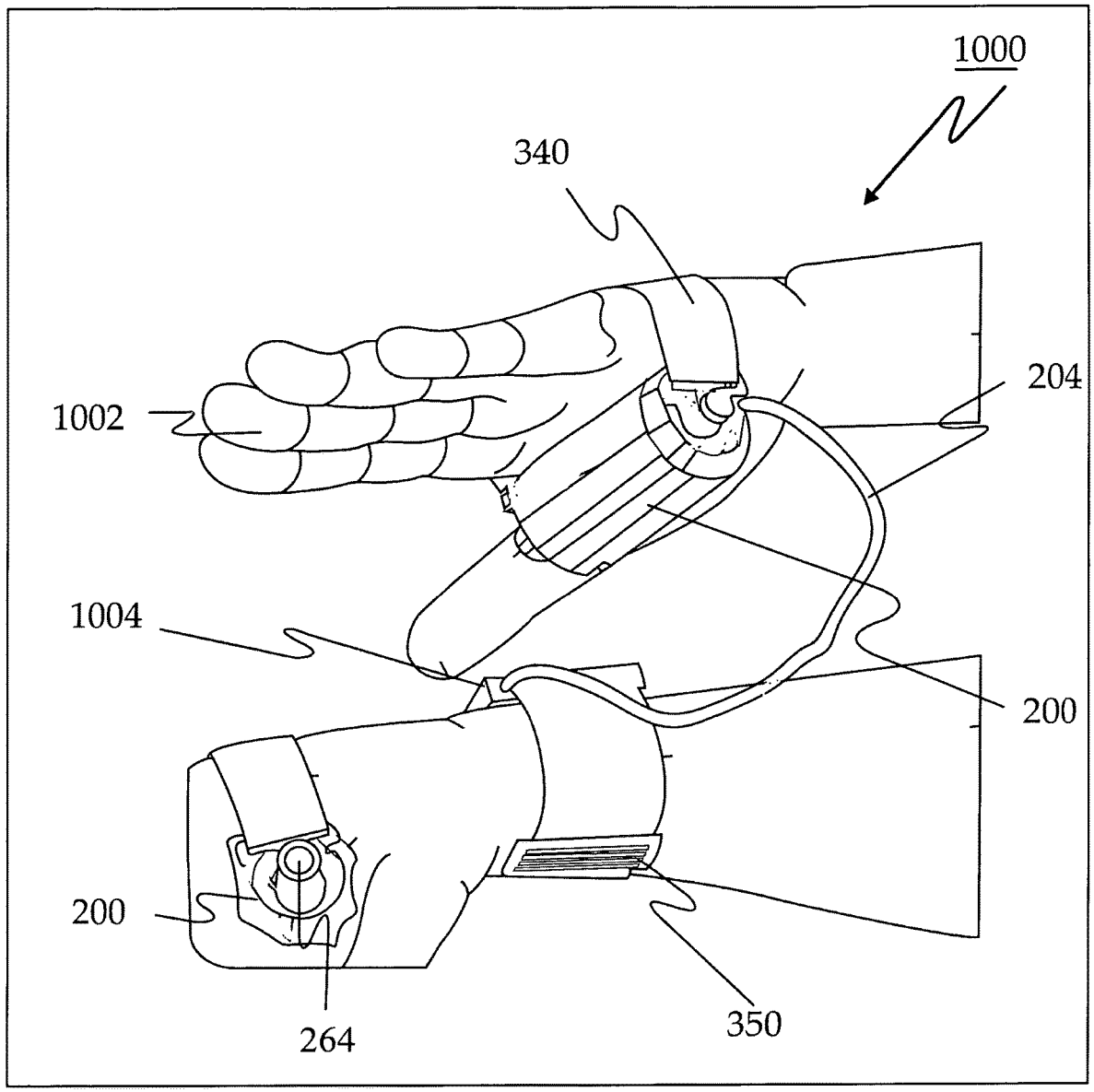
FIG. 18A illustrates an exemplary view of the handheld section 200 secured to a subjects 1002 palm through a strap 340, in accordance with an embodiment of the invention.
Figure 18B:
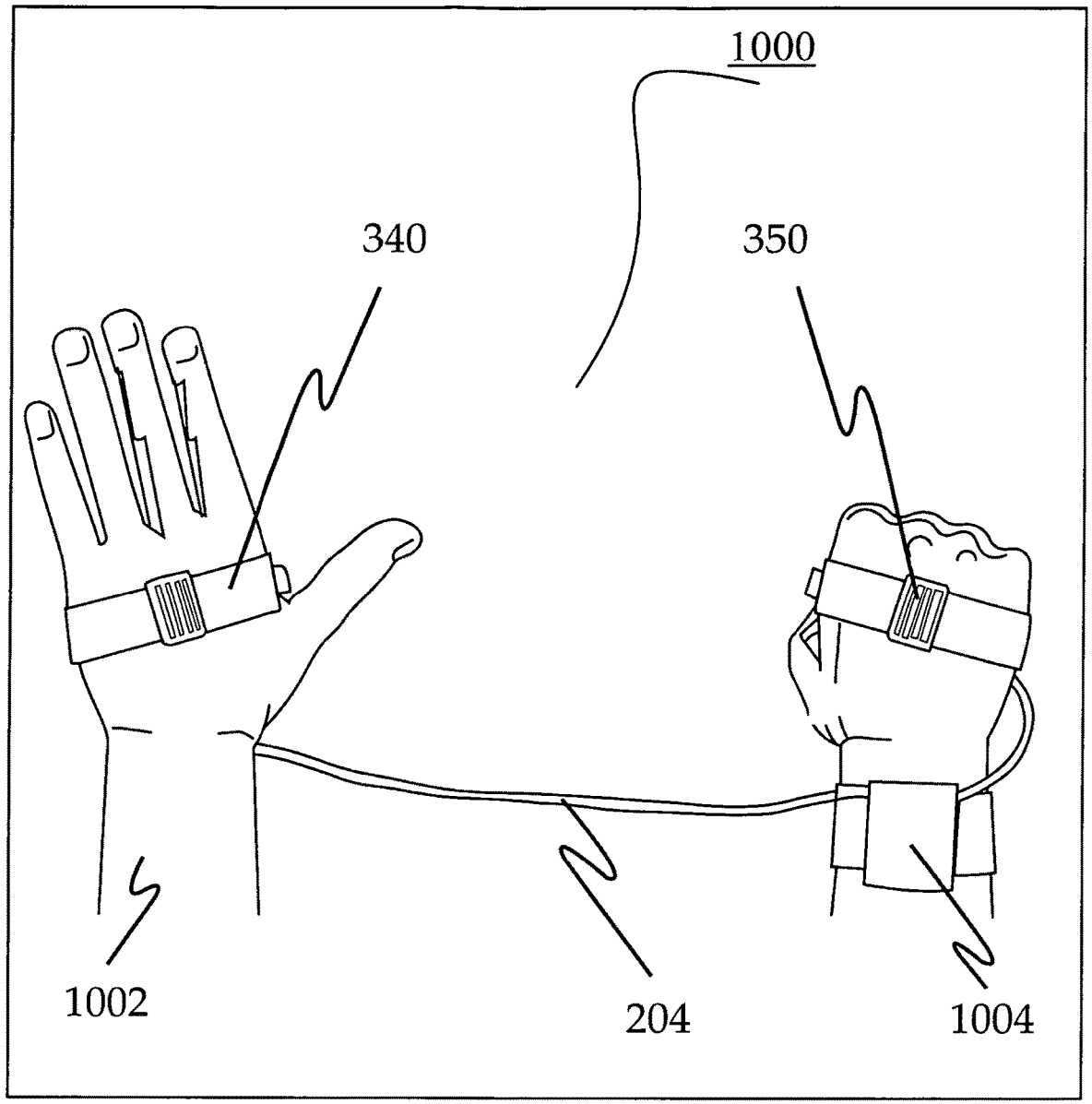
FIG. 18B illustrates another exemplary view of the handheld section 200 secured to a subjects 1002 palm through a strap 340, in accordance with an embodiment of the invention.

FIG. 18A illustrates an exemplary view of the handheld section 200 secured to a subjects 1002 palm through a strap 340, in accordance with an embodiment of the invention. As illustrated in the figure the subject 1002 is holding two handheld sections 200 one in each hand secured by the strap 340 to the left and right hand the palms, respectively. The handheld sections 200 are communicably connected to the controller 1004. FIG. 18B illustrates another exemplary view of the handheld section 200 secured to a subjects 1002 palm through a strap 340, in accordance with an embodiment of the invention.

In an embodiment, the controller may be coupled with an additional memory to store one or more motion picture information. Additionally, the controller may be powered by a rechargeable battery either inbuilt or externally connected to the controller. The controller may be connected to an external system to receive information corresponding to controlling of the handgrip section and the recoil section. Further, the controller may control the operation of the handgrip section and the recoil section based on the received information from the external system.

In an embodiment, the handgrip section may include a sensor to detect contact with the subject. Further, the controller may turn ON the handgrip section only if it is in contact with the subject. In an embodiment, the external surface of the handgrip section is covered with a shock absorption material to prevent vibration noise in case the handgrip section in placed anywhere other than the subject hand. In an embodiment, the shock absorption material may include but not limited to foam, rubber, silicon, and fabric.

In an embodiment external material coatings and layer material coatings may be provided to reduce rattling and noise produced by the one or more vibration motors.

The present invention overcomes the drawbacks of the conventional solutions, by providing a tactile simulation system to enhance the user experience of viewer watching a motion picture. The present invention as discussed in this document with respect to different embodiments may be advantageous at least in enhancing the user experience of a viewer of motion pictures such as, but not limited to, movies, video games and other videos. This is enabled by providing a compact, inexpensive and personal device to enable a motion picture viewer to experience at least one additional sensory experience in addition to sound and visual provided by typical motion picture. This invention is further advantageous in providing recoil simulations and one or more vibrations that may be experienced at an appropriate time based on the motion picture content viewed by the subject. Additional advantages not listed may be understood by a person skilled in the art in light of the embodiments disclosed above.

Although embodiments have been described with reference to specific example embodiments, it may be evident that various modifications and changes may be made to these embodiments without departing from the broader spirit and scope of the tactile simulation system. Accordingly, the specification and drawings are to be regarded in an illustrative rather than a restrictive sense.

Many alterations and modifications of the present invention may no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents.

What is claimed is:

1. A tactile simulation system configured to be used by a subject watching a motion picture, the tactile simulation system comprising: a handgrip section configured to generate one or more vibration, wherein the one or more vibration is experienced by the subject holding the handgrip section; a recoil section configured to generate one or more recoil simulation, wherein the recoil section is removably attached to the handgrip section and further includes an actuator, a wheel assembly operably connected to the actuator, and a piston section operably connected via a shaft attached perpendicular to the wheel and off center such that the rotation of the wheel sets the piston in a linear motion; and a controller operably connected to the handgrip section and the recoil section, wherein the controller is configured to operate the handgrip section and the recoil section based on the motion picture.

2. The tactile simulation system according to claim 1, wherein the piston section comprises a slot rail; and wherein the piston section and the wheel are connected through the slot rail, and configured to set the piston section in linear motion.

3. The tactile simulation system according to claim 1, wherein the recoil section further comprises a piston guide tunnel; wherein the piston section comprises a piston head at each end of the piston section and a slot rail there between; and wherein the movement of the piston heads is arrested in directions other than the direction of the internal wall within the piston guide tunnel.

4. The tactile simulation system according to claim 1, wherein the recoil section further comprises a coupling section, wherein the coupling section is configured to detachably attach to the handgrip section.

5. A tactile simulation system configured to be used by a subject watching a motion picture, the tactile simulation system comprising: a recoil section configured to generate one or more recoil simulation, wherein the recoil section comprises: an actuator, a wheel assembly, operably connected to the actuator, and further comprises a shaft attached perpendicular to a surface of the wheel and off center of the wheel; a piston section operably connected to the wheel assembly such that the rotation of the wheel sets the piston in a linear motion, wherein abrupt movement of the piston section within the recoil section generates the one or more recoil simulation by the subject holding the tactile simulation system; and a controller operably connected to the recoil section, wherein the controller is configured to operate the recoil section based on the motion picture.

6. The tactile simulation system according to claim 5, wherein the piston section comprises a slot rail; and wherein the piston section and the wheel are connected through the slot rail, which receive the shaft on the surface of the wheel.

\* \* \* \* \*